Sept. 5, 1944.  C. F. McCONNELL ET AL  2,357,674
METHOD OF AND MEANS FOR SELECTING, REPRODUCING,
AND ASSEMBLING ITEMS OF DATA
Filed Jan. 30, 1939   15 Sheets-Sheet 4
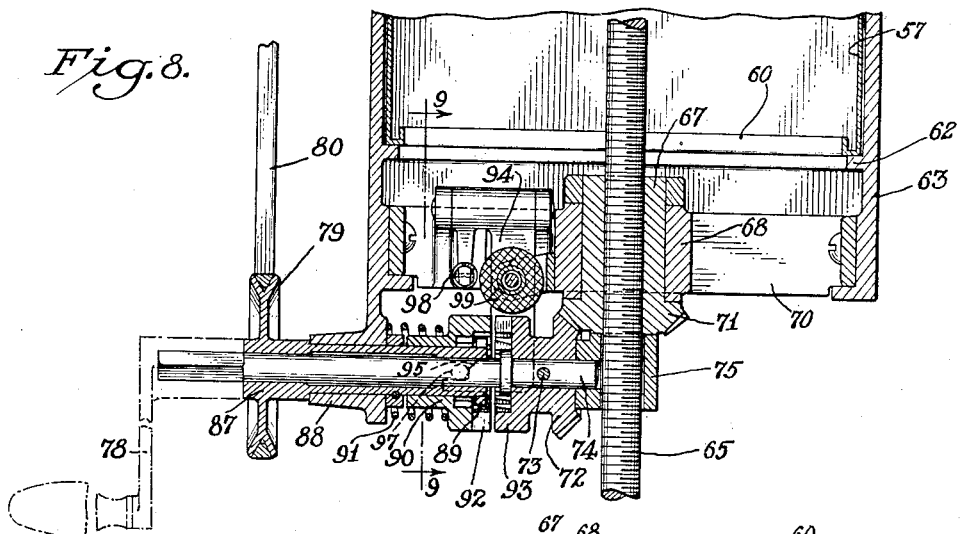
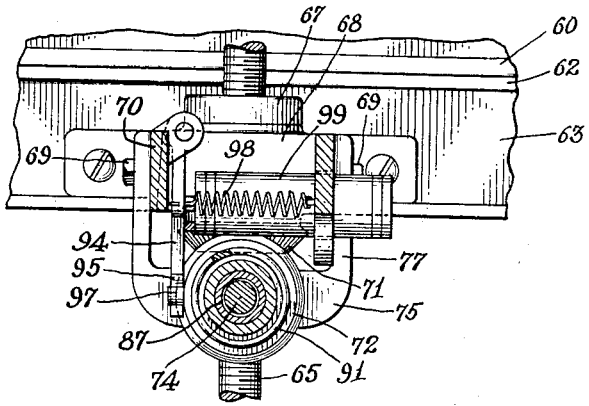
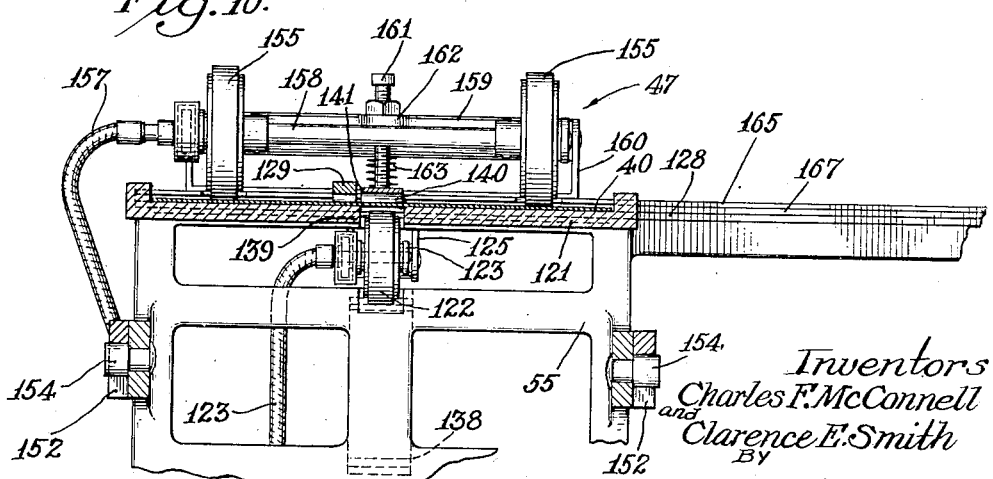
Inventors
Charles F. McConnell
and Clarence E. Smith
By
Parker, Carlson, Pitzner & Hubbard
Attorneys.

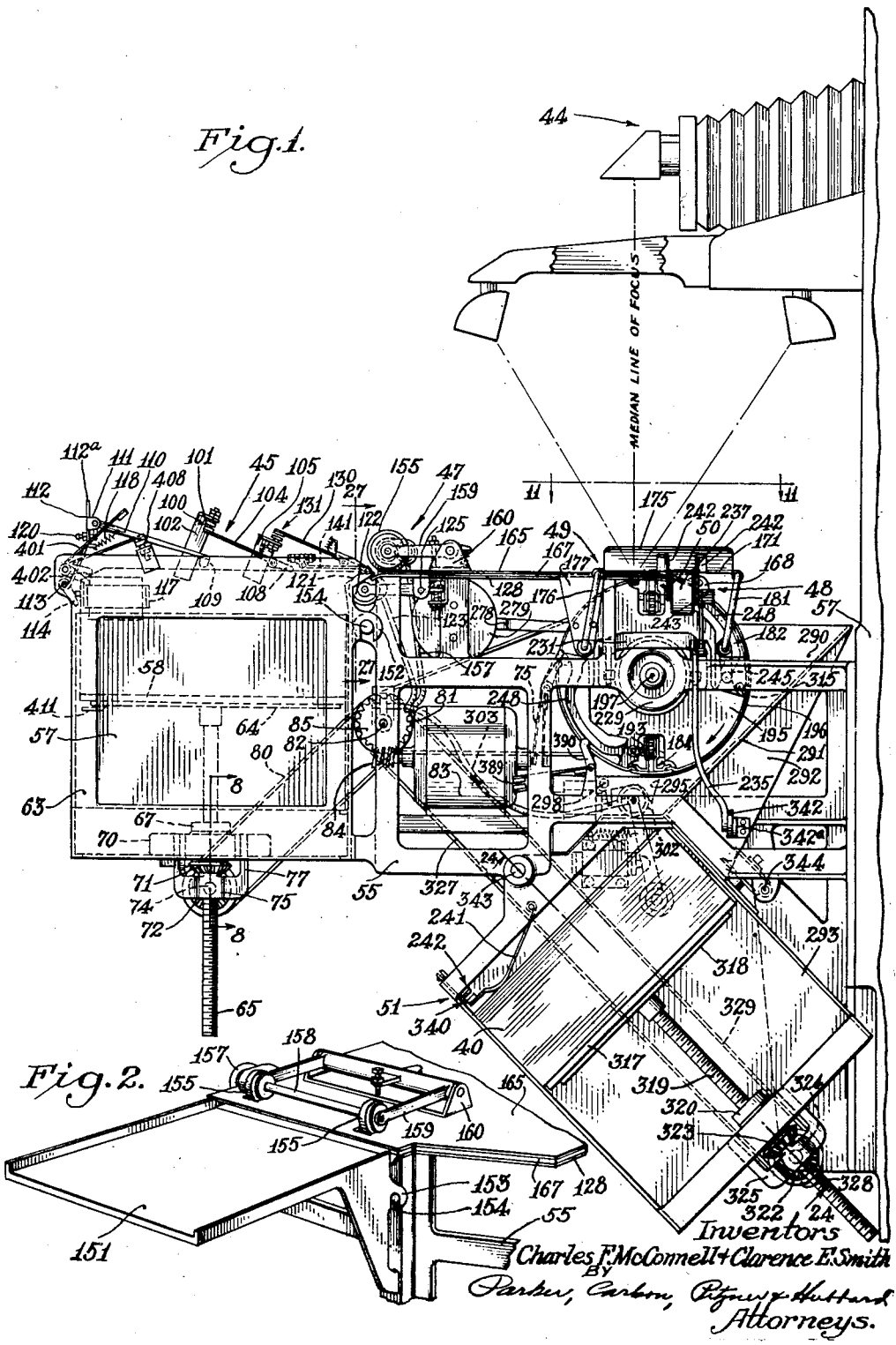

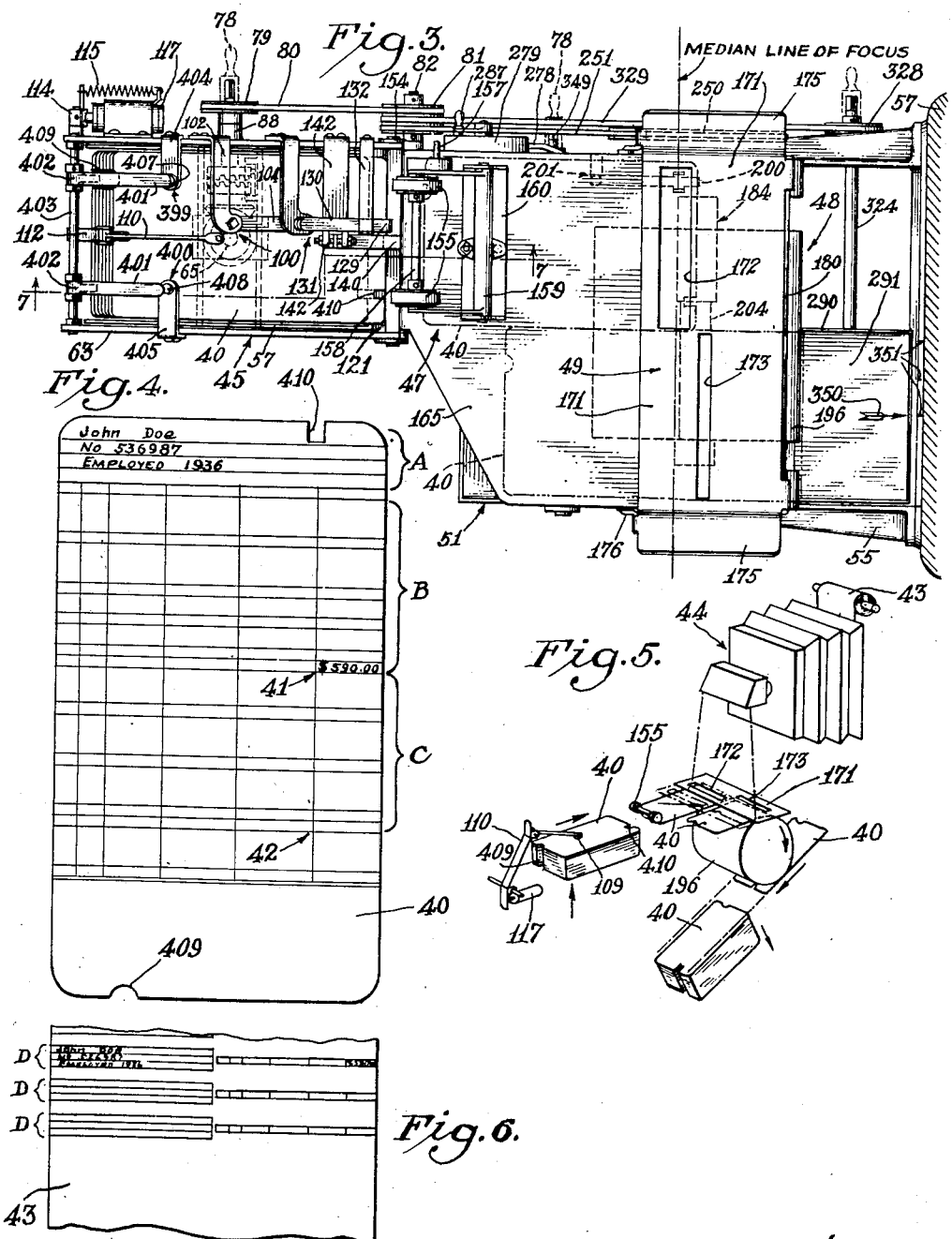
Sept. 5, 1944.  C. F. McCONNELL ET AL  2,357,674
METHOD OF AND MEANS FOR SELECTING, REPRODUCING,
AND ASSEMBLING ITEMS OF DATA
Filed Jan. 30, 1939  15 Sheets-Sheet 2
Inventors
Charles F. McConnell
and Clarence E. Smith
BY
Parker, Carlson, Pitzner & Hubbard
Attorneys.

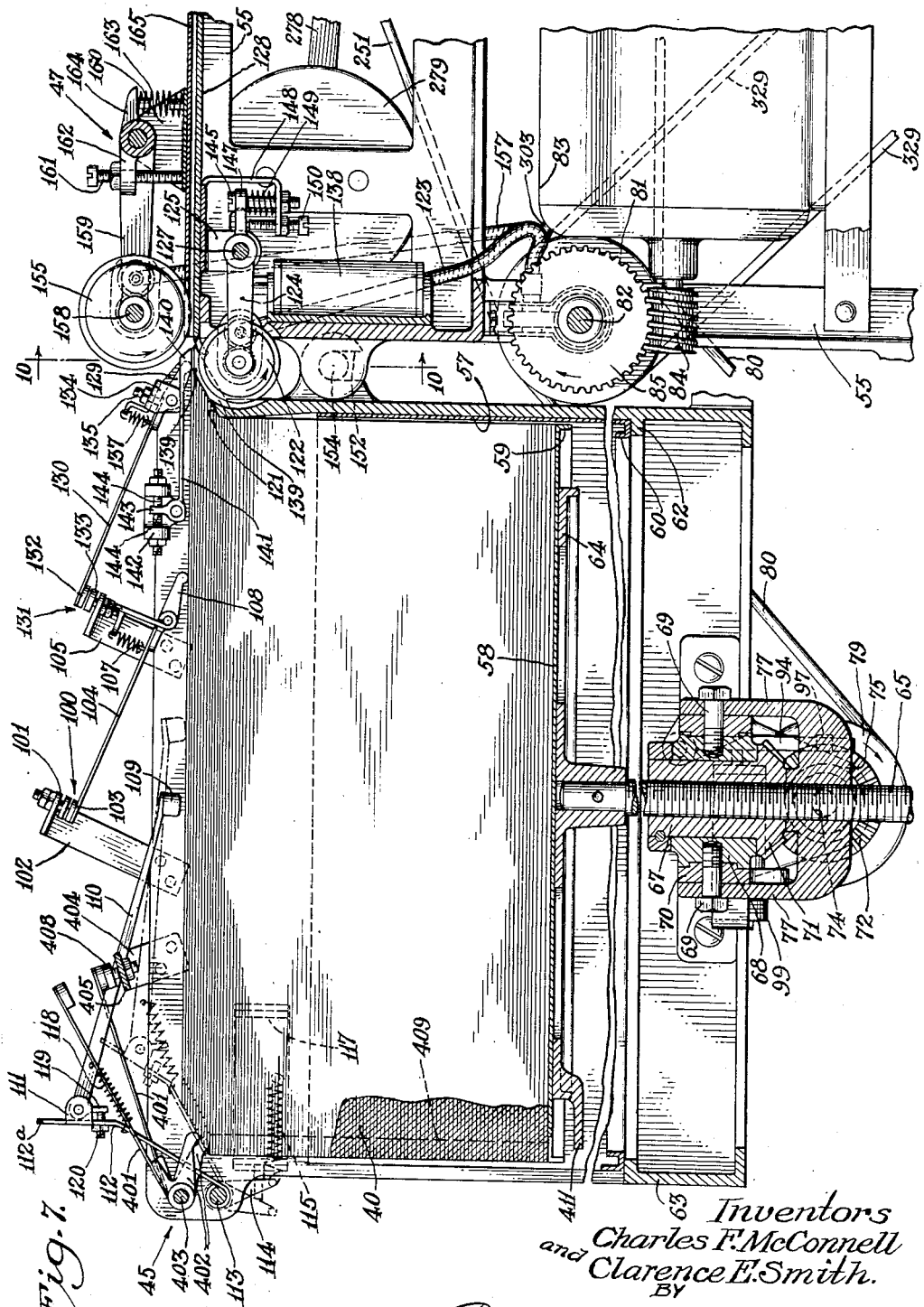

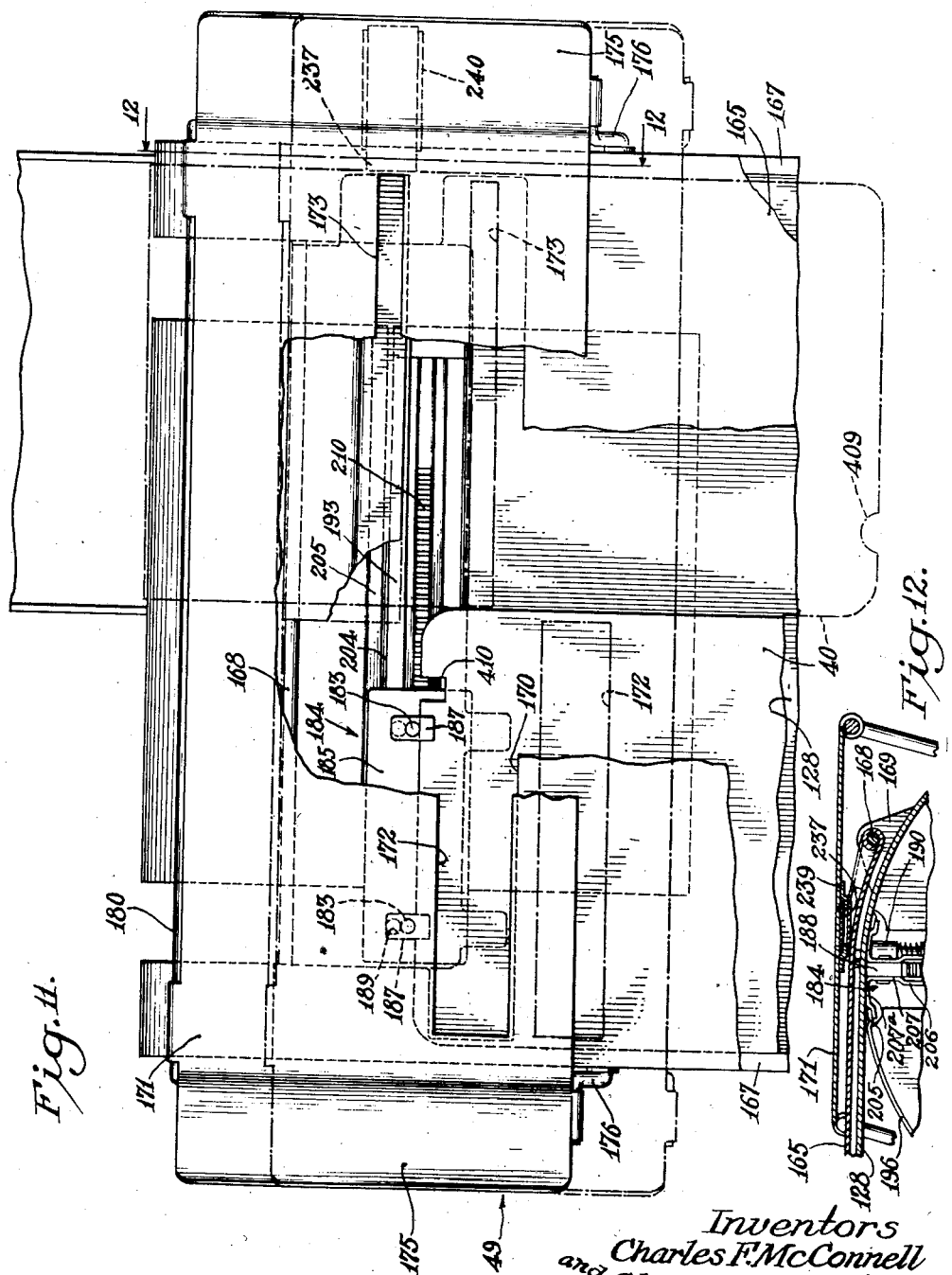

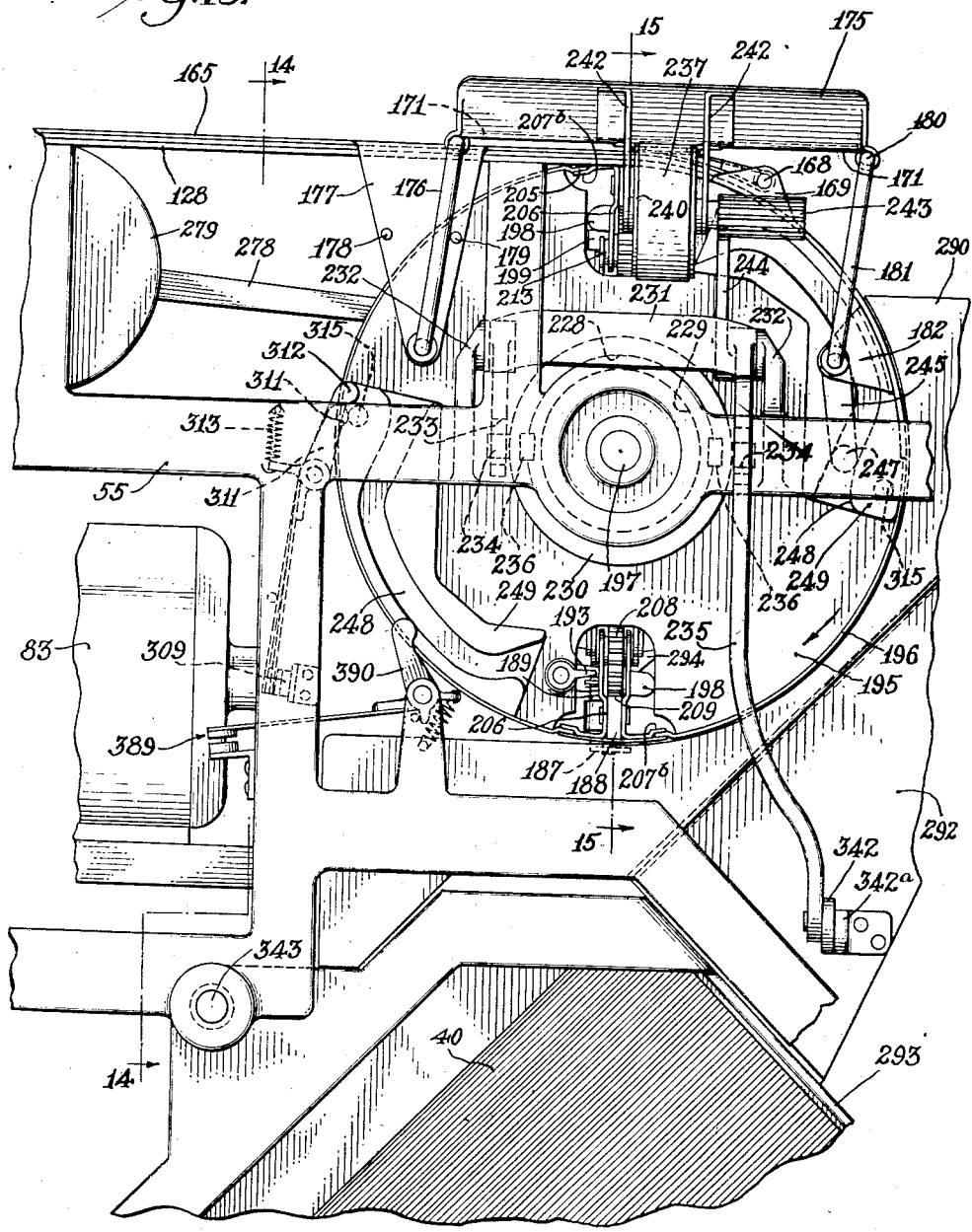

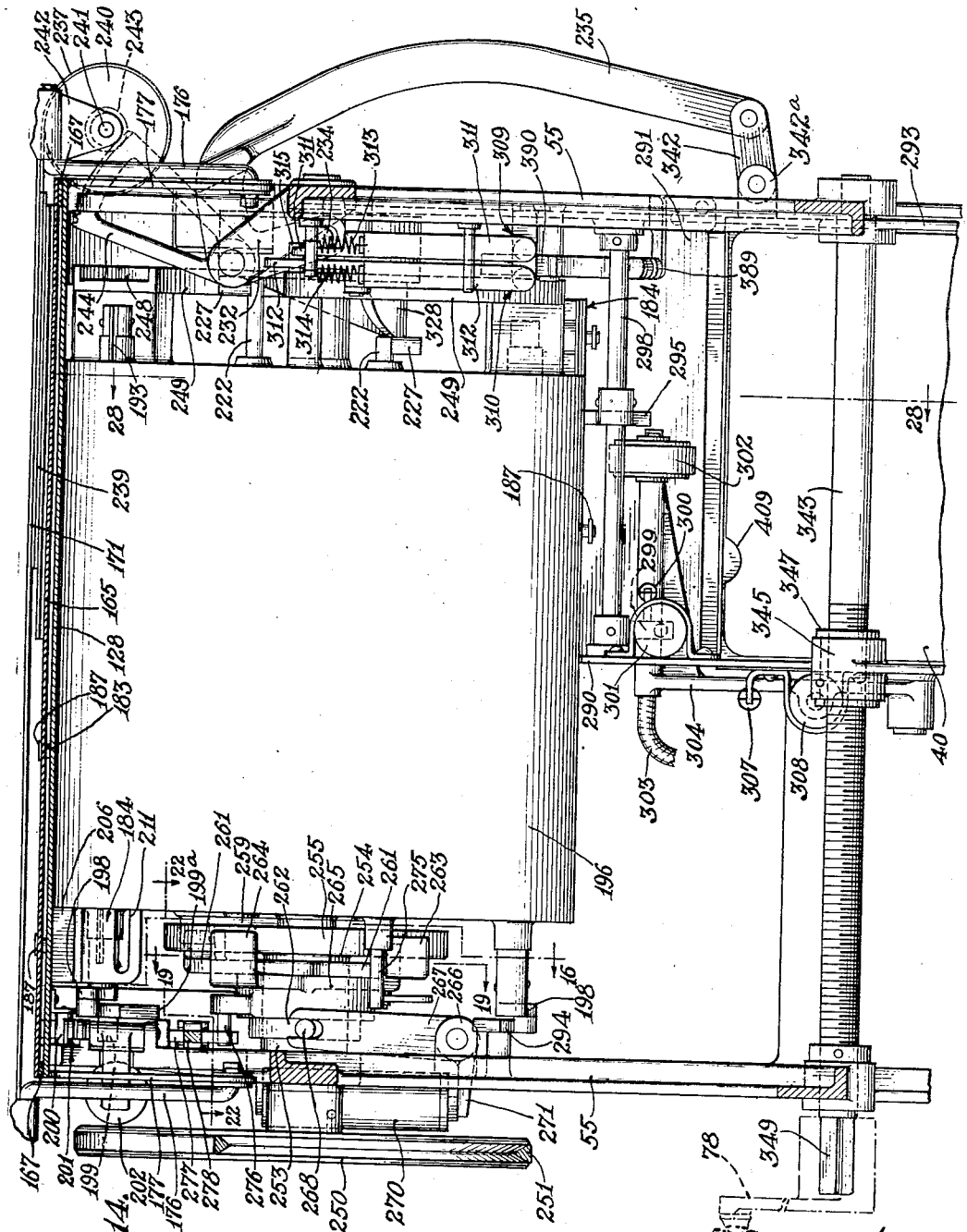

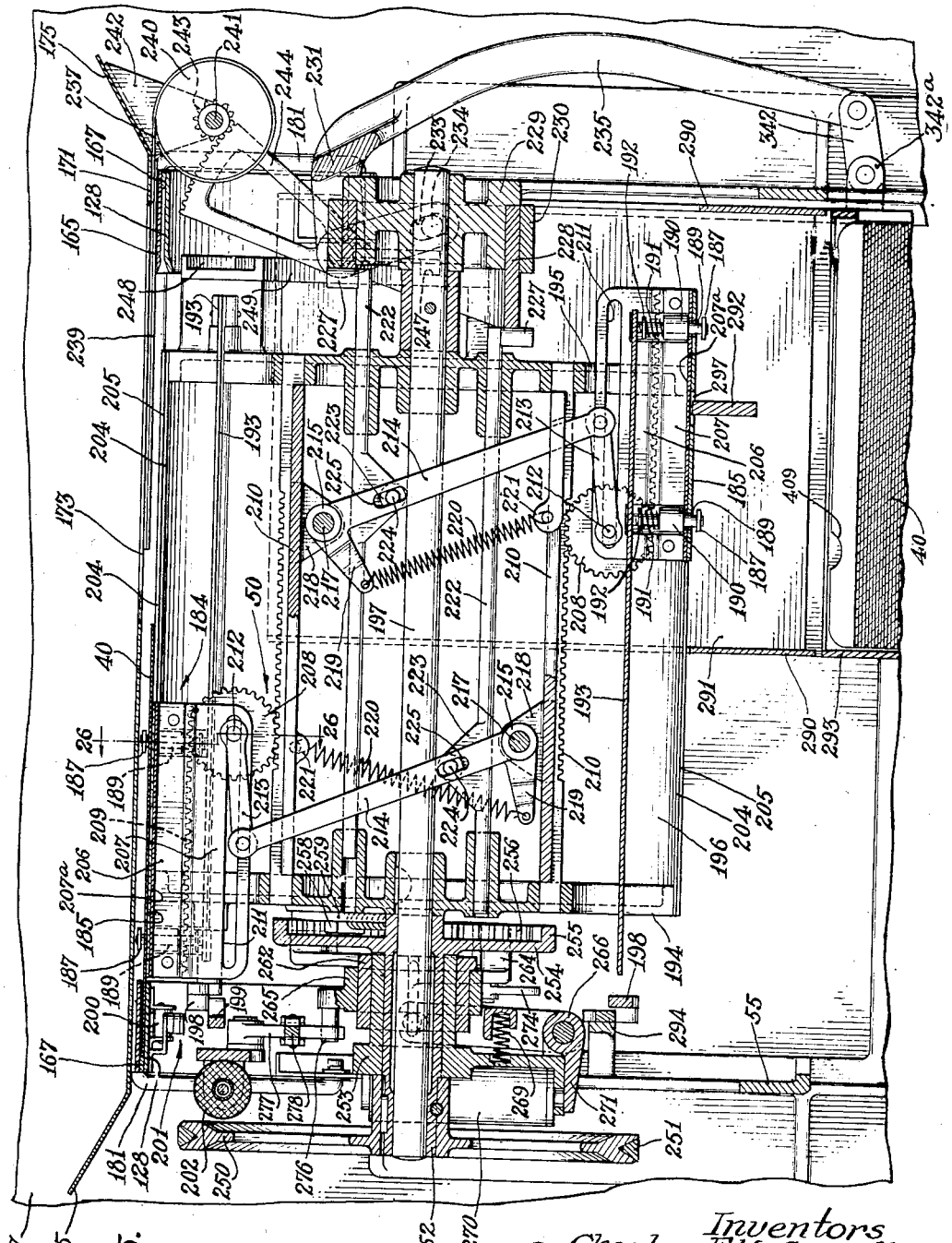

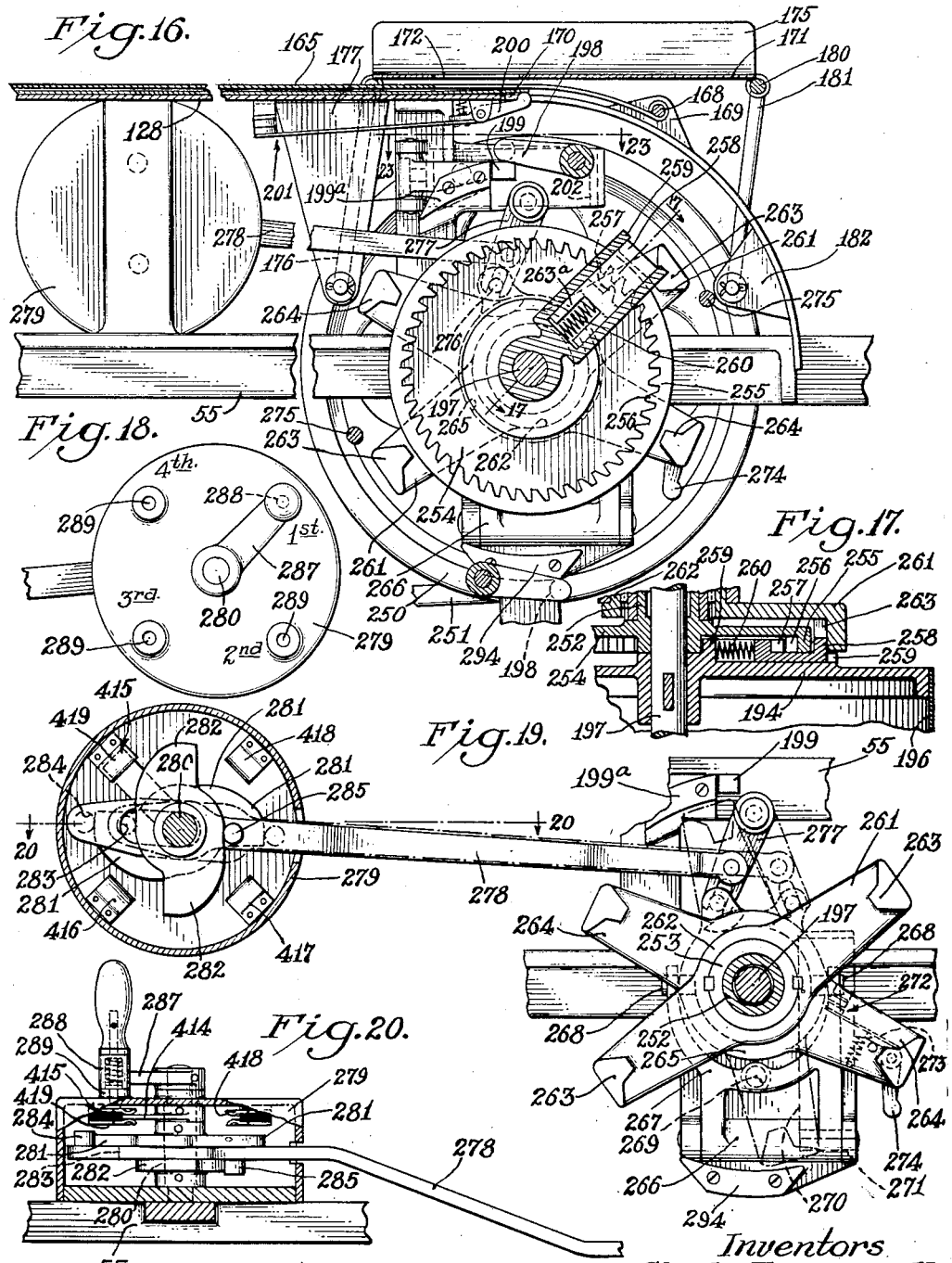

Sept. 5, 1944.　　C. F. McCONNELL ET AL　　2,357,674
METHOD OF AND MEANS FOR SELECTING, REPRODUCING,
AND ASSEMBLING ITEMS OF DATA
Filed Jan. 30, 1939　　15 Sheets-Sheet 10
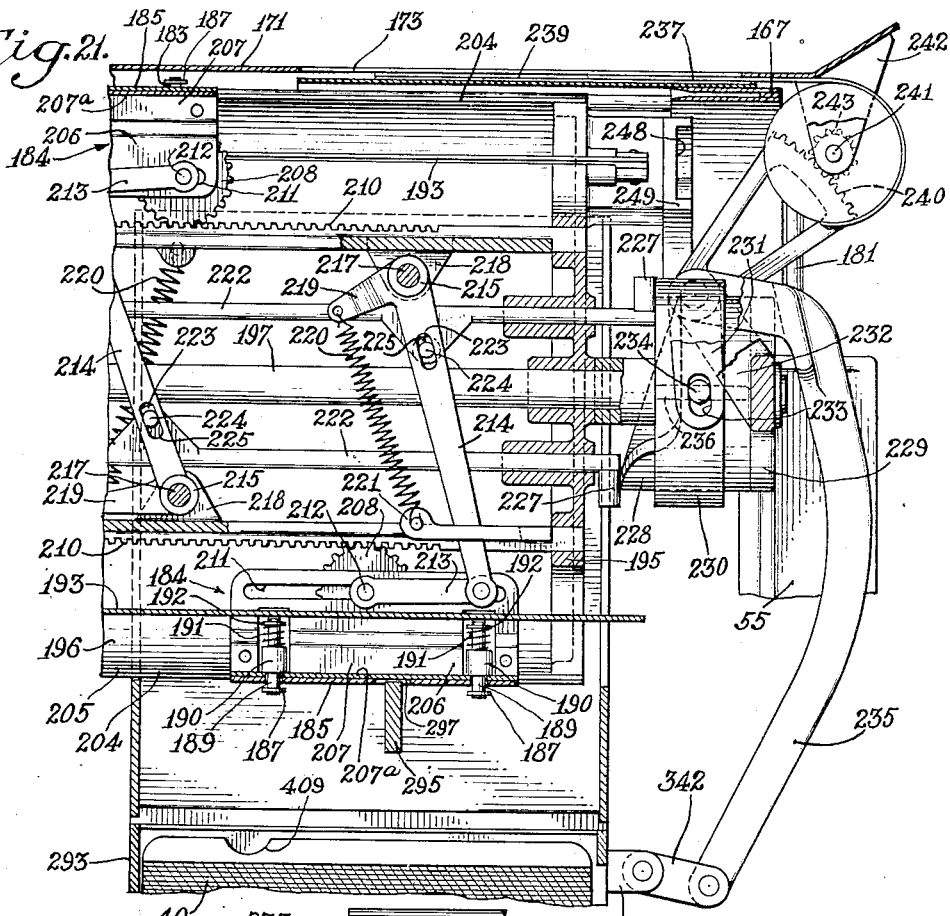
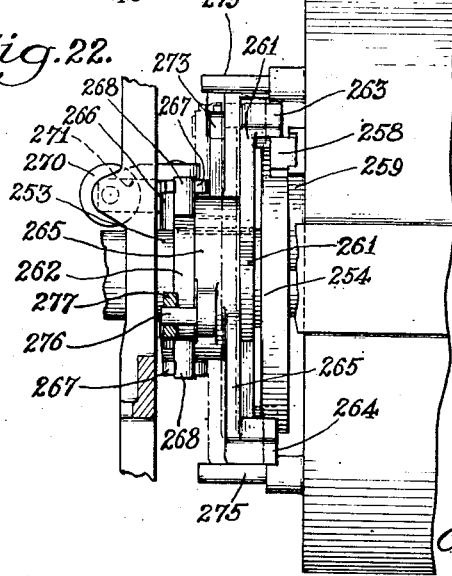
Inventors
Charles F. McConnell
and Clarence E. Smith
BY
Parker, Carlson, Pitner & Hubbard
Attorneys.

Sept. 5, 1944. C. F. McCONNELL ET AL 2,357,674
METHOD OF AND MEANS FOR SELECTING, REPRODUCING,
AND ASSEMBLING ITEMS OF DATA
Filed Jan. 30, 1939 15 Sheets-Sheet 11
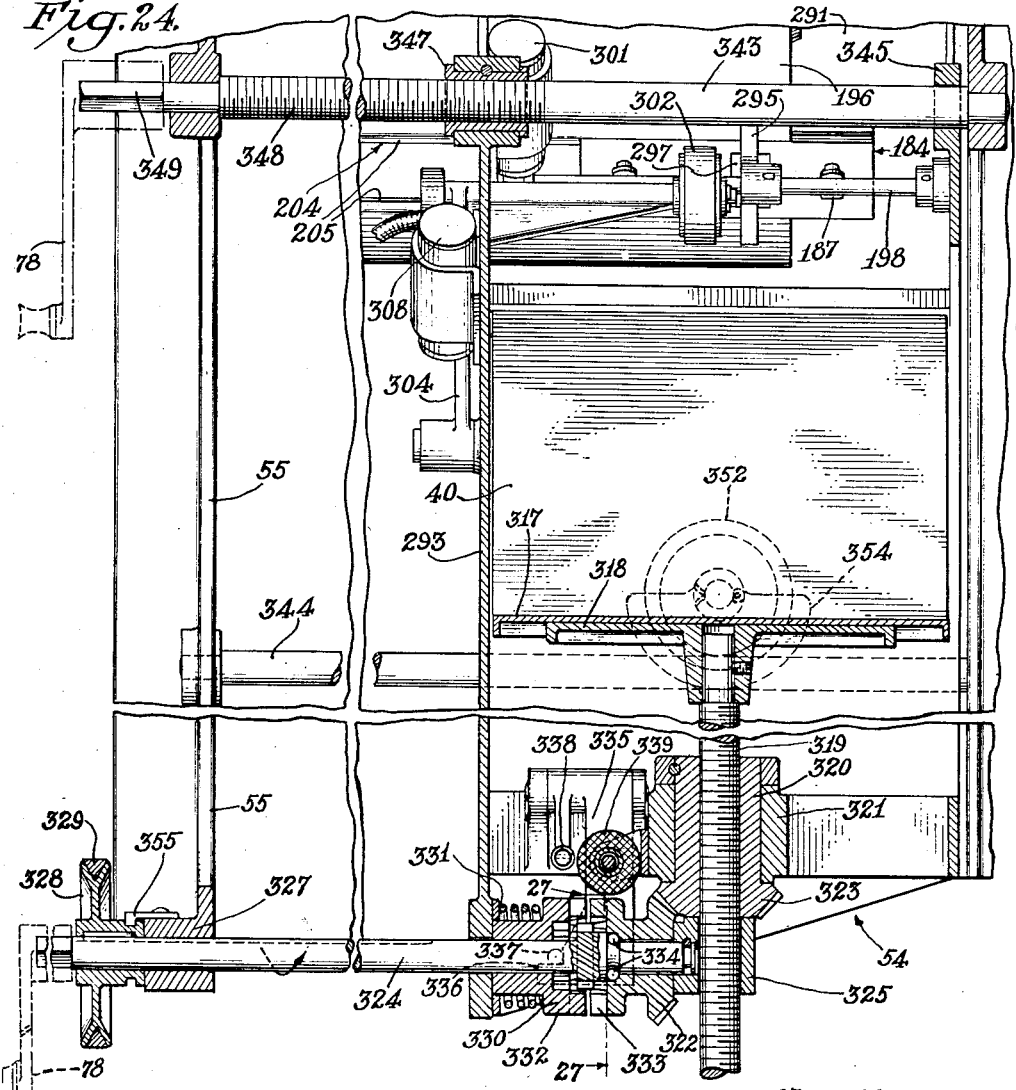
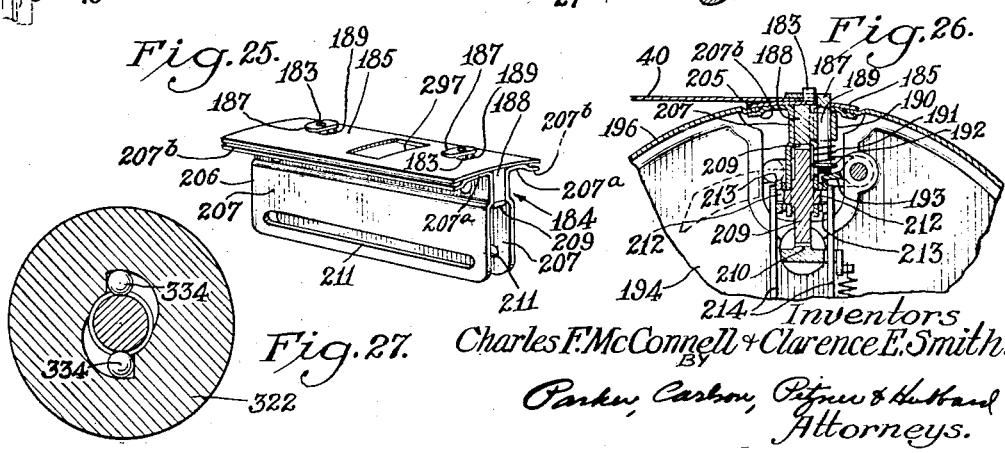
Inventors
Charles F. McConnell + Clarence E. Smith.
BY
Parker, Carson, Pitzner & Hubbard
Attorneys.

Sept. 5, 1944.　　　C. F. McCONNELL ET AL　　　2,357,674
METHOD OF AND MEANS FOR SELECTING, REPRODUCING,
AND ASSEMBLING ITEMS OF DATA
Filed Jan. 30, 1939　　　15 Sheets-Sheet 12

Inventors
Charles F. McConnell
and Clarence E. Smith
BY
Parker, Carlson, Pitzner & Hubbard
Attorneys.

Fig. 29.

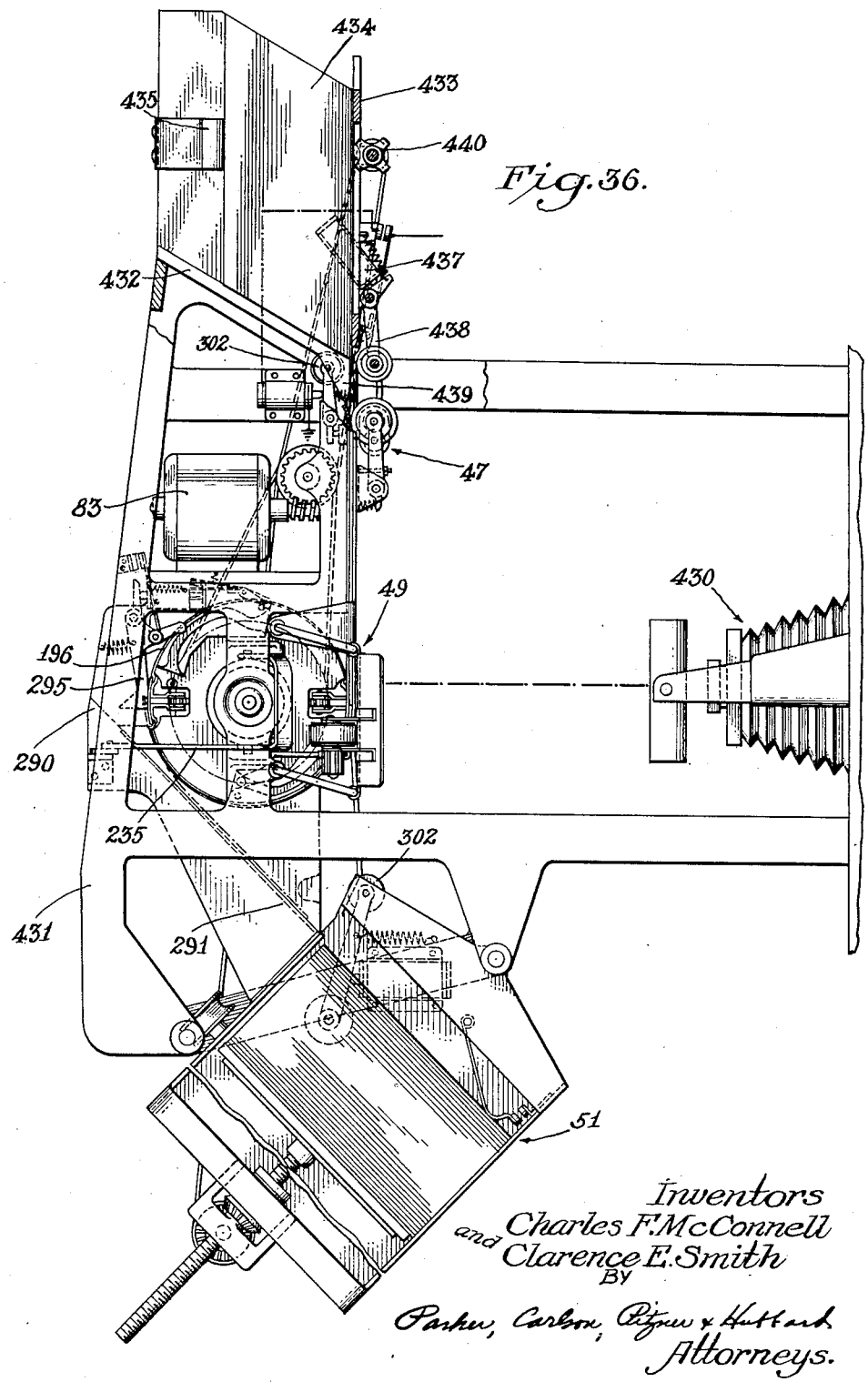

Patented Sept. 5, 1944

2,357,674

UNITED STATES PATENT OFFICE 2,357,674

METHOD OF AND MEANS FOR SELECTING, REPRODUCING, AND ASSEMBLING ITEMS OF DATA

Charles F. McConnell, Oak Park, and Clarence E. Smith, Chicago, Ill., assignors to Sears, Roebuck and Co., Chicago, Ill., a corporation of New York Application January 30, 1939, Serial No. 253,562

20 Claims. (Cl. 88—24)

This invention concerns a novel method of selecting, reproducing and assembling items of data; and means for practicing the method.

It has been the practice heretofore in gathering together data from separate record sheets into an assemblage such as a continuous list, to prepare a typewritten transcript. However, where a large number of items must be assembled such procedure requires a great amount of time and labor not only for the actual work of transcribing but also for checking purposes. Even with careful checking there has been ever present the liability of errors in the transcript. Business concerns and institutions where the preparation of such assemblages from voluminous records must be undertaken at frequent intervals, as for governmental tax reports and other purposes, have found the prior procedure a costly clerical burden.

A general object of the present invention is to reduce substantially the necessary labor and expense involved in selecting, reproducing and assembling separate items of data into a list and at the same time to increase substantially the speed, efficiency and accuracy with which this can be accomplished.

Another object of the invention is to provide a novel method of and means for assembling separate items of data by producing facsimiles of such items and arranging the facsimiles in predetermined order upon a common base.

A further object of the invention is to provide a method of and means by which a plurality of remotely located items of data appearing in separated relation on an individual record sheet are reproduced in facsimile one by one and grouped in juxtaposed alinement transversely across an elongated base sheet in predetermined orderly sequence together with the facsimile groups derived from numerous other individual record sheets.

An additional object of the invention is to reproduce and assemble the items of data photographically.

Still another object of the invention is to provide an apparatus for reproducing selective items of data in facsimile wherein individual record sheets containing the selective items on remote portions thereof and facsimile-producing means are relatively moved cooperatively during operation to effect the selection and proper grouping and orderly assemblage of the items upon the facsimile record.

A still further object of the invention is to provide for use with a facsimile-producing device a machine which will automatically and coordinately with the operation of the facsimile-producing device handle successive individual record sheets, select from the sheets the items of data to be reproduced in facsimile and after the facsimiles have been made deliver up the record sheets in the same order in which they are delivered to the machine.

Yet another object of the invention is to provide in a novel machine of this character automatic record-sheet delivery and feeding mechanism, means for selecting the items of data to be reproduced, means for positioning the record sheets relative to the facsimile-producing device, stacking means for receiving and delivering up the recorded sheets, means for synchronously effecting adjustments of the positioning and the stacking means, and means for coordinating the operations of the machine and the facsimile-producing means.

Other objects and advantages will become apparent in the following description and from the accompanying drawings in which:

Figure 1 is a side elevational view of apparatus embodying the principles of the invention.

Fig. 2 is a fragmentary perspective view showing a modified form of delivery means for the machine.

Fig. 3 is a plan view of the apparatus shown in Fig. 1.

Fig. 4 is a face view of an exemplary form of record sheet upon which may be contained the individual items of data to be selected for assemblage.

Fig. 5 is a schematic view showing a method of handling the record sheets.

Fig. 6 is a face view of a fragmentary portion of a facsimile assemblage of data such as may be produced by the present invention.

Fig. 7 is an enlarged fragmental longitudinal sectional view taken substantially along line 7—7 of Fig. 3.

Fig. 8 is an enlarged fragmentary sectional detail view taken substantially along line 8—8 of Fig. 1.

Fig. 9 is a sectional view taken substantially along line 9—9 of Fig. 8.

Fig. 10 is a sectional detail view taken substantially along line 10—10 of Fig. 7.

Fig. 11 is a fragmentary plan view of a portion of the top of the machine taken substantially in the plane of line 11—11 of Fig. 1 and with certain parts broken away to show details of construction.

Fig. 12 is a fragmentary sectional view taken substantially along line 12—12 of Fig. 11.

Fig. 13 is a fragmentary elevational view of the right hand end of substantially that portion of the machine shown in Fig. 11.

Fig. 14 is a transverse sectional view taken substantially along line 14—14 of Fig. 13.

Fig. 15 is a transverse sectional view taken substantially along line 15—15 of Fig. 13.

Fig. 16 is a fragmental sectional view taken substantially along line 16—16 of Fig. 14.

Fig. 17 is a fragmentary sectional view taken substantially along line 17—17 of Fig. 16.

Fig. 18 is a front elevational view of the cam housing and handle of the drum-clutch adjusting mechanism.

Fig. 19 is a sectional view taken substantially along line 19—19 of Fig. 14.

Fig. 20 is a fragmentary sectional view taken substantially along line 20—20 of Fig. 19.

Fig. 21 is a fragmentary sectional elevational view taken in substantially the same plane as Fig. 15 but showing only the right side portion of the machine with certain of the parts in different operative relationships.

Fig. 22 is a fragmentary sectional plan view taken substantially along line 22—22 of Fig. 14.

Fig. 23 is a fragmentary sectional plan view taken substantially along line 23—23 of Fig. 16.

Fig. 24 is a fragmental sectional view taken substantially along line 24—24 of Fig. 1.

Fig. 25 is a perspective view of one of the sheet-engaging and shifting carriages.

Fig. 26 is a fragmentary sectional elevational view taken substantially along line 26—26 of Fig. 15.

Fig. 27 is a fragmentary sectional elevational view taken substantially along line 27—27 of Fig. 24, and on an enlarged scale.

Fig. 29 is a circuit diagram of a system of electrical operating circuits for the apparatus.

Fig. 30 is a small scale, face view of another form of record sheet.

Fig. 31 is a top plan view of a slightly modified form of the invention.

Fig. 32 is a transverse sectional elevational view taken substantially along line 32—32 of Fig. 31.

Fig. 33 is a perspective view of a modified form of item-selecting mask.

Fig. 34 is a sectional elevational view taken substantially along line 34—34 of Fig. 32.

Fig. 35 is a diagrammatic view showing steps in the operation of the modified form of the invention shown in Fig. 31.

Fig. 36 is a side elevational view of a further modified form of the invention.

Figure 28:
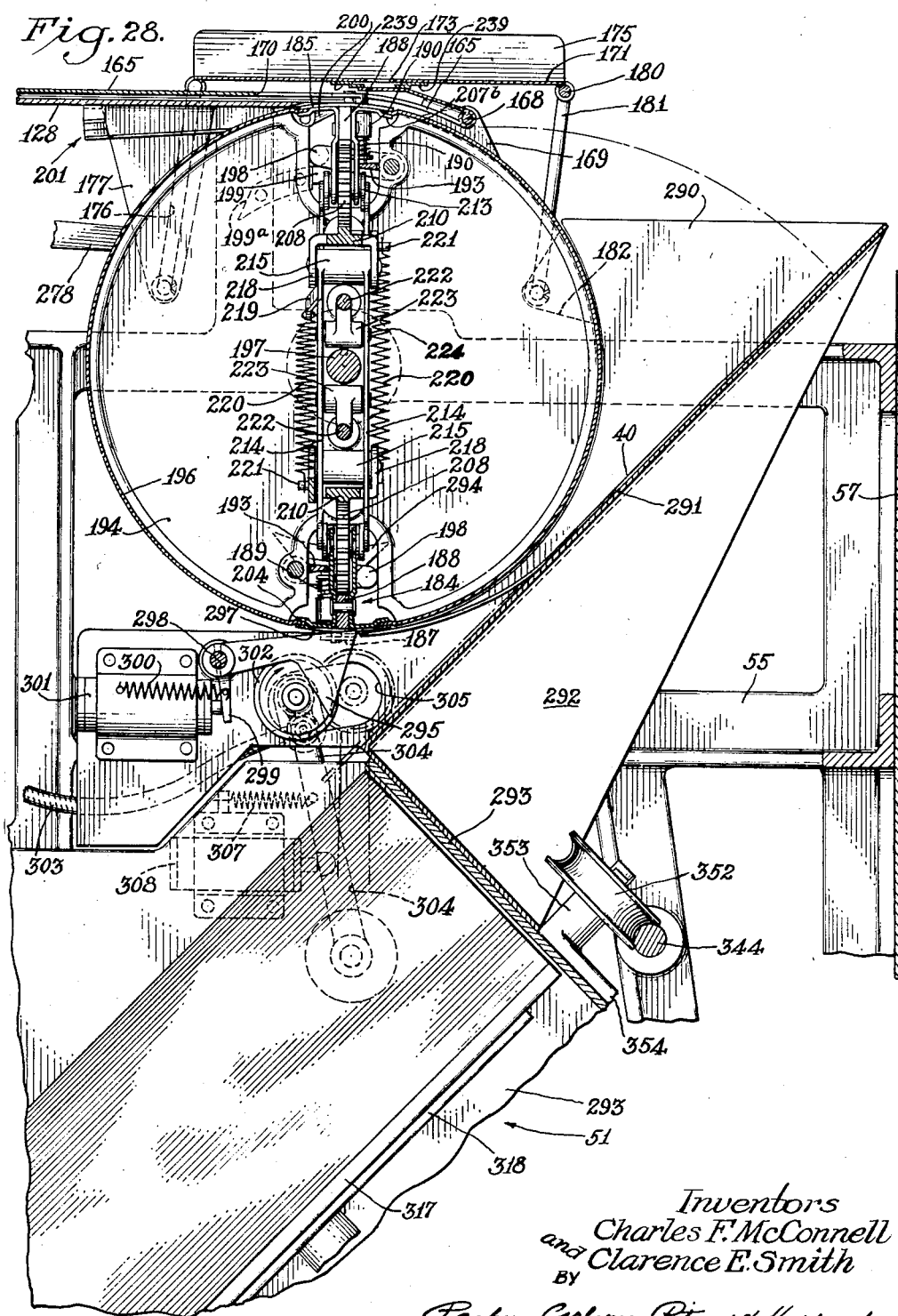
Fig. 28 is a fragmentary sectional elevational view taken substantially along line 28—28 of Fig. 14.

While the invention is susceptible of various modifications and alternative constructions we have shown in the drawings and will herein describe in detail the preferred method and certain preferred apparatus, but it is to be understood that we do not thereby intend to limit the invention to the specific forms disclosed, but intend to cover all modifications and alternative constructions falling within the spirit and scope of the invention as expressed in the appended claims. Attention is also called to the fact that while it may be necessary in order to convey a thorough understanding of the invention to describe with particularity one or more forms of record sheet, this is not to be construed as a limitation upon the scope of the invention since it will be clear that various forms of record sheet, containing any of a large variety of different kinds of data to be assembled, may be handled according to this invention.

By the present invention a plurality of individual items of data, such as names, numbers, figure totals or the like which appear on a data or record sheet can, even though located on relatively remote portions of the sheet, be selected from a mass of such data and reproduced in facsimile on another sheet in a preferred group relationship. Upon the facsimile-containing sheet, serving as a common base, may then be reproduced in facsimile in prefered sequence additional groups of items of data respectively selected from other record sheets. In one manner of using this method, the facsimiles of the items of data are produced photographically upon a sensitized base such as a negative film, photostat, or the like, which may be in the form of a continuous strip sheet. Thereby an entire assemblage of data or a summary list containing a large number of groups of data in facsimile may be furnished on a single sheet or strip which can be rolled up or folded into a compact bundle. Moreover, the facsimiles may be produced on a substantially smaller scale than the originals so that the bundle of the finished list will occupy only a small filing or storage space.

General description

By way of example, to facilitate an understanding of the invention, it will be assumed that a list is to be prepared of the employees of a business establishment and their individual earnings over a given period, such as a quarter year, as required for certain tax returns. Such a list must contain the data necessary to identify the employees as well as the data relating to the taxable wages each has earned in the given period. This data is usually recorded upon individual employment record cards or sheets from which it must be selected, reproduced and assembled.

In Fig. 4, is shown one side of a record card or sheet 40 which may serve as an individual employment record, a portion A at the top thereof containing the necessary employee identification data such as name, number, employment date, and the like. The body of this record sheet may be appropriately subdivided and apportioned to receive a weekly, monthly and quarterly record of the employee's time and wages as well as other desirable data over an entire year, each side of the sheet being adapted to contain a half-year record. In the present instance each side of the sheet is divided into two sections, B and C, each of which will cover a quarter-year period. At the end of each quarter the taxable wages paid during that quarter may be totaled in the spaces identified at 41 and 42 of the sections B and C, respectively.

In preparing the list according to the present invention, a facsimile reproduction will be made of the data contained in the top portion A of the record sheet, which for convenience will be referred to hereinafter as the "primary data." Along with this a facsimile reproduction will be made of the data appearing as a quarterly numerical total in either of the selective spaces 41 or 42, which will hereinafter be denominated as the "secondary data." Preferably the two items of data thus reproduced will be rearranged to appear in linear juxtaposition to provide a group D transversely of a facsimile-base sheet 43 (Fig. 6). Any preferred dimensions as to width and length may be provided in the base sheet 43. As shown, it is just wide enough to receive the facsimile group D, and it may be of any preferred length to receive an orderly succession of the facsimile groups all of which will be similarly derived from individual record sheets.

Although in principle the invention is not intended to be limited to any particular process of making the facsimiles of the groups D, a suitable photographic process may be used to advantage for accuracy of reproduction, adaptability with respect to arrangement of the assembled data, and compactness because of the practicability of making the facsimiles on a substantially smaller scale than the original data items. A photographic recording instrument of any suitable character, indicated generaly at 44 (Figs. 1 and 5), may be used to produce the facsimiles upon the base sheet 43, which for this purpose may be a photographic negative film, a sensitized photostat paper, or the like. The lens of the instrument is sharply focused upon a predetermined, limited field and each record sheet is positioned first to locate the primary data of the portion A thereof in the field at substantially the median line of focus, with all but the primary data concealed from the effective photographic range of the instrument. Thereupon the instrument is operated to make the photographic reproduction or facsimile of the primary data upon the sensitized base 43. Thence the record sheet is shifted to bring the selected secondary data item 41 or 42 to the median line of focus and in juxtaposition to the place which had been occupied by the primary data, all of the remainder of the record sheet, of course, being concealed. At this point, the recording instrument is again operated so as to photograph the selected secondary data as part of the group D in juxtaposition to the facsimile of the primary data already upon the sensitized base 43. This procedure is repeated and the sensitized base 43 is advanced step by step by suitable increments until the selected data from as many of the record sheets 40 as desired has been reproduced in facsimile in the preferred assemblage.

Referring to Figs. 1 and 3, a preferred form of machine for handling the record sheets 40 in cooperation with the recording instrument 44 includes means, generally indicated by the numeral 45, for supporting the sheets in a stack for successive delivery to means 47 by which they are fed into proper position in the photographic field of the recording instrument. There each of the record sheets 40 is held by means 48 with only the primary data portion A exposed to be photographed while the remainder of the sheet is concealed or masked by means 49. After the recording instrument 44 has been actuated, the sheet 40, still engaged by the means 48, is repositioned relative to the concealing means 49 by the operation of suitable adjustably controlled mechanism 50 to expose either of the selected secondary data items 41 or 42 to be photographed. Thereafter, the repositioning means functions to discharge the photographed record sheet to restacking mechanism 51 which collects the successive discharged record sheets to deliver them up in the same order in which they were originally delivered to the machine.

The entire machine may be constructed as a compact, unitary assembly upon a suitable framework 55 which may be associated with the recording instrument 44 in any suitable manner such as by attachment to a common base structure 57. Suitable electrically operated controls may be furnished to correlate the various features of the apparatus for automatic cyclical operation.

Sheet delivery means

The sheet delivery means 45 is preferably constructed to support a relatively large stack of the record sheets 40 for delivery automatically one at a time from the stack to the feeding means 47. To this end, the delivery means includes a removable, high-walled sheet supporting tray 57 within which a stack of the sheets can be readily assembled and transported to the machine (Fig. 7). The bottom of the tray may consist of a plate 58 having a marginal downturned flange 59 at all four sides to engage removably within a channel-shaped, inturned base flange 60 provided along the lower edges of the tray walls. When the tray is in sheet-delivery position, the base flange 60 will rest upon the shoulder furnished by a suitable inwardly projecting flange 62 near the bottom of a surrounding framework 63 which defines in effect, a tray-receiving well open at the front for insertion or removal of the tray.

A suitable elevator is provided for raising the stack of sheets from the tray 57 for delivery. Herein an elevator table 64 is supported under the tray-base plate 58 in any suitable manner as by a vertical feed screw 65 fixed thereto. Actuation of the elevator may be effected through the medium of a driving nut 67 through which the feed screw is threaded (Figs. 7 and 8). A bearing for supporting the nut rotatably in a fixed axial position is provided by a stationary collar 68 which is suitably attached as by means of bolts 69 to a supporting bracket 70 mounted at the lower end of the well framework 63. The lower end of the driving nut 67 is formed as a bevel pinion 71 which meshes with a bevel gear 72.

Passing through and fixedly secured as by means of a pin 73 to the bevel gear 72 is a driving shaft 74 which has its inner end journaled in a bearing bracket 75. Support for the bearing bracket is provided by a pair of upstanding arms 77 which are secured to the supporting bracket 70 by the collar-attachment bolts 69. When the drive shaft 74 is rotated in one direction, herein counterclockwise as seen in Fig. 9, the nut 67 will be correspondingly rotated by the bevel gear 72 to advance the elevating screw 65. Upon reversing the rotation of the shaft 74 the elevating screw will, of course, be retracted.

Power for rotating the elevator driving shaft 74 in either direction may be applied manually as through the medium of a conventional crank 78 which may be inserted removably upon the squared outer end of the shaft. On the other hand, the shaft may be power driven through the medium of a power transmission pulley 79 and a driving belt 80 which runs over a continuously driven main driving pulley 81 (Figs. 3 and 7). The latter is secured to a main drive shaft 82 which is continuously driven by a suitable prime mover such as a motor 83. A driving connection between the motor and the main drive shaft is effected by power transmission gearing such as a worm 84 on the motor shaft meshing with a transmission gear 85 fast upon the main drive shaft. Both the motor and the main drive shaft may be supported by the main frame 55 of the machine.

For practical purposes, it is desirable to have an arrangement such that the elevator driving shaft 74 may be rotated by hand either to advance or retract the elevating screw 65 at any time, while the power driving means will operate only at predetermined intervals to rotate the driving shaft in but one direction, namely, to advance the elevating screw 65. To this end, the power transmission pulley 79 is carried at the outer end of a sleeve or tubular shaft 87 which is coaxial about and freely rotatable relative to the elevator driving shaft 74. A bearing hub 88 extending rigidly below the well framework 63 provides a journal for the tubular shaft 87. At its inner end, the tubular shaft carries a fixed star clutch element 89 which is adapted to be engaged by a clutch member 90 mounted in freely slidable coaxial relation about the tubular shaft. The clutch member 90 is normally biased, as by means of a compression spring 91, to move into engagement with the star clutch element 89. At the same time that the clutch member 90 is in engagement with the star element 89, clutch teeth 92 projecting from the clutch member are adapted to mesh with complementary clutch teeth 93 upon the bevel gear 72. Thus, it will be observed that when the clutch member 90 and the star clutch element 89 and the clutch teeth 93 of the bevel gear are in operative interengagement, power will be transmitted from the continuously rotating tubular shaft 87 to advance the elevating screw 65.

Suitable means is provided for holding the clutch member 90 normally disengaged and for permitting it to become active only when it is necessary to effect elevation of the stack of leaves 40 to bring the top of the stack to the proper delivery level. Herein such means includes a declutching bar 94 which is pivotally mounted upon the supporting bracket 70 to depend adjacent to the clutch mechanism. A declutching cam finger 95 projecting rigidly from the bar will engage a clutch release pin 97 which projects radially from the clutch member 90 (Figs. 8 and 9). A tension spring 98 normally holds the declutching bar 94 in its operative position so that the finger 95 will engage the pin 97, and suitable control means such as a solenoid 99 is provided for shifting the declutching bar 94 pivotally out of engagement with the clutch release pin 97 when the elevator is to be actuated to raise the stack. Thus, when the declutching bar 94 is in its normal operative position, the clutch member 90 will be held inactive in opposition to the compression spring 91, but instantly upon energization of the solenoid to release the declutching bar the clutch member will act to connect the parts of the drive to raise the elevator.

Energization of the solenoid 99 is controlled by a switch 100 which forms part of an electrical circuit to be more fully described hereinafter. This switch contains an adjustable stationary contact 101 which is supported by a bracket 102 mounted upon the upper part of the well framework 63. A movable contact 103 for the switch is carried at one end of an actuating lever 104 which is pivotally supported by a suitable bracket 105 also mounted upon the upper part of the framework 63. A tension spring 107 normally tends to pivot the actuating lever 104 into switch-closing position.

The free end of the actuating lever is formed as a contact finger 108 and is located to be engaged and shifted by the uppermost sheet 40 of the stack when the stack has been elevated to delivery position. This causes the actuating lever 104 to tilt in opposition to the force of the tension spring 107 and thus separate the contacts 101 and 103 to open the switch 100. Thereupon, the clutch-controlling solenoid 99 will be deenergized to permit the declutching bar 94 to swing into declutching position and thus halt the elevating movement. After the stack of sheets has been thinned down to a predetermined extent by delivery of sheets therefrom, the switch 100 will again be closed to bring about further elevation of the stack.

Novel automatically operable means is provided for delivering the sheets 40 one at a time from the top of the stack to the feeding means 47. Such delivering means herein includes a pusher pad 109 made of rubber or other suitable gripping material which is mounted at the rear end of a pusher bar 110. At its opposite end, the pusher bar is pivotally connected to a yoke 111 near the top of a normally generally upright actuating bar 112. The latter is carried by a horizontal rock shaft 113 which is supported pivotally across the front of the well framework 63 at a substantially lower level than the normal working level of the stack of sheets 40. The position of the actuating lever 112 and the rock shaft 113 is such that when the actuating lever is swung inwardly it will engage the upper forward corner of the stack and push the uppermost leaves in progressively advanced or feathered relationship toward the feeding mechanism 47. A rigid lever 114 depends from one end of the shaft 113 and is connected to a tension spring 115 which tends normally to rock the shaft forwardly to hold the actuating lever 112 in its outermost position away from the stack of leaves 40 (Figs. 3 and 7).

When a leaf 40 is to be delivered from the stack, a solenoid 117 is energized to kick against the lever 114 in opposition to the tension spring 115 so as to rock the shaft 113 rearwardly and thereby swing the actuating bar 112 inwardly to advance the pusher bar 110 and to feather the top few sheets. The uppermost leaf will thus be engaged by the pusher 109 and forced to move rearwardly beyond the stack. Leaf-engaging pressure upon the pusher is effected by a tension spring 118 connected across the angle between the pusher bar 110 and the actuating bar 112. Upon return of the actuating bar 112 to initial position, a stop lug 119 which depends from the pusher bar 110 will engage an adjustment screw 120 mounted upon the actuating bar 112 and cause the pusher 109 to be lifted slightly above the stack. A finger hold for actuating the pusher manually is provided by an upstanding extension 112a at the top of the actuating bar 112.

As the leaves 40 of the stack are feathered rearwardly by the actuating bar 112 they engage an inclined retaining shoulder 121 over the top of which the uppermost sheet may be advanced by the pusher 109. Occasionally, however, more than one sheet may advance over the shoulder 121 simultaneously and suitable kick-back means is therefore provided for returning the additional sheet or sheets to the stack. Herein such kickback means includes a rubber tired roller 122 which is continuously driven rotatably by means of a suitable flexible shaft 123 connected by suitable gearing in any preferred manner to transmit driving power from the main drive shaft 82. This roller is supported rotatably adjacent to but below the top surface of the shoulder 121 by a pair of horizontal arms 124 which are pivotally connected at their opposite ends to a bracket 125 by means of a rock shaft 127. Support is provided for the bracket 125 by the lower face of a sheet-receiving table 128 which is carried by the main framework 55 of the machine rearwardly of and in a plane with the top of the shoulder 121.

When more than one sheet is delivered over the shoulder 121 to the table 128, a detector finger 129 will be engaged and shifted to swing a switch lever 130 for closing a normally open electrical switch 131. In the present instance this switch consists of a movable contact 132 carried by the switch lever 130 and an adjustable stationary contact 133 mounted upon the supporting bracket 105. The detector finger and switch lever are carried pivotally by a suitable bracket 134 which is mounted upon the top rear part of the well framework 63 and carries an adjustable abutment stud 135 to hold the detector finger and switch lever against the force of a tension spring 137 normally in a position of adjustment where only a single sheet may pass the detector finger freely. When more than a single sheet enters between the detector finger and the top of the shoulder 121 the spring 134 will yield to permit the switch-closing movement of the switch lever 131.

Closure of the switch 131 closes a circuit (to be hereinafter more fully described) to cause a solenoid 138, which is mounted below the roller supporting arms 124, to become energized and to swing the arms upwardly about the rock shaft 127. This will carry the kick-back roller 122 upwardly through a slot 139 in the shoulder 121 to engage and force the extra sheet back into place in the stack. In order to provide a base against which the kick-back roller 122 can operate, an abutment pad 140 is supported over the slot 139 as by means of an arm 141 (Figs. 7 and 10). The latter is pivotally supported by a bracket 142 and carries an adjustment boss 143 which is engaged between adjustment screws 144 carried by the bracket. Through this arrangement accurate adjustment of the abutment pad 140 can be effected relative to the kick-back roller 122 and the top of the shoulder 121.

As soon as the extra sheet has been kicked back, the switch 131 will, of course, be opened, and the solenoid 138 will become deenergized to permit the kick-back roller to drop to its initial position. In the present instance such initial position is determined by a headed pin or bolt 145 which passes through an ear 147 connected to the roller supporting arms 124 and which is mounted upon an angular bracket arm 148 that depends from the main kick-back roller bracket 125 and in part underlies the ear 147. The head of the bolt 145 serves to limit the descent of the kick-back roller, and a compression spring 149 surrounding the limit bolt between the ear 147 and the underlying part of the bracket arm 148 acts to shift the roller 122 positively to initial position after deenergization of the solenoid 138. A limit upon the approach of the kick-back roller 122 to the abutment pad 140 under the influence of the solenoid 138 may be suitably determined as by means of an adjustable limit stud 150 to avoid engagement by the roller of the properly advancing topmost record sheet after the extra sheet has been returned. This stud may conveniently be threaded adjustably upwardly through the underlying part of the bracket arm 148 for engagement by the ear 147.

If, instead of delivering the record sheets automatically by the delivery means 45 as described, it is desired to deliver the sheets individually by hand, a manual delivery table 151 may be substituted (Fig. 2). To render such substitution convenient, the well framework 63 and the delivery table 151 may be provided at the rear thereof with attachment hooks 152 and 153, respectively, which will removably engage suitable supporting pins 154 upon the main frame 55 of the machine (Fig. 10). When in delivery position, the top of the manual delivery table 151 will be in the same plane as the top of the table 128 to which the sheets are delivered.

Sheet-feeding means

As each record sheet 40 is delivered to the table 128, it is engaged by the feeding means 47 to be advanced over the table 128. For this purpose, the feeding means includes a pair of rubber-tired feeding rollers 155 which are continuously driven through the medium of a flexible shaft 157 which is suitably geared at one end to a feed roller shaft 158 and at the opposite end to the main drive shaft 82 (Figs. 1, 3, 7 and 10). In this manner the feed rollers 155 are continuously driven while the machine is in operation.

An adjustable support for the feed rollers 155 is provided by a substantially horizontally extending carrying yoke member 159, the arms of which provide journals for the feed roller shaft 158. The carrying yoke is pivotally supported by the upstanding arms of a U-shaped bracket 160. Proper adjustment of the feed rollers 155 to maintain a non-contacting spaced relationship of the peripheries thereof from the top of the table 128 is effected by means of an adjustment screw 161 which is threaded through a rigid ear 162 on the inside of the pivot portion of the roller-carrying yoke 159 and which abuts the base of the bracket 160. Resilient tension is maintained on the feed rollers by a compression spring 163 to hold them in feeding position but to permit yielding of the rollers when necessary. The spring 163 may be located between the base of the bracket 160 and a suitable ear 164 extending rearwardly from the carrying yoke 159.

Sheet-concealing and masking means

In the present instance the supporting bracket 160 of the sheet-feeding means is mounted fixedly upon a removable shield plate 165 (Figs. 3, 7 and 10) which overlies the table 128 and serves as one of the principal elements of the concealing and masking means 49. The shield plate 165 rests upon spacers 167 located at the side margins of the table 128 which serve to hold the shield plate in spaced relation to the table a sufficient distance to permit free passage thereunder of the record sheets 40 (Figs. 11 and 14). If it is desired to gain access to the table under the shield plate 165, the latter may be lifted to swing upwardly about a horizontal axis provided at the rear thereof by a supporting rod 168 which extends between a pair of upstanding ears 169 at the opposite side edges of the table 128 (Figs. 1, 11, 12 and 13). To expose the necessary data-containing portions of the underlying record sheets 40, the shield plate 165 is appropriately cut out transversely to twice the width of the record sheets 40 to provide a substantial opening or exposure aperture 170 along the median line of focus of the recording instrument 44.

For the purpose of selecting the data which is to be photographically reproduced from the portions of the record sheets exposed through the shield plate aperture 170; suitable means is provided such as a superposed shiftably mounted mask plate 171. The latter is provided with appropriately dimensioned primary and secondary data selection apertures 172 and 173, respectively, which are shown herein as elongated in form and disposed in substantially end-to-end relation to register with respectively the left and right half portions of the exposure aperture 170. These selection apertures are, however, relatively offset so that only one at a time will be in register with the exposure aperture while the other will be over a solid portion of the shield plate 165. Furthermore, the dimensions of the mask plate 171 and its relationship to the shield plate 165 are such that with the exception of the portion of the record sheet which is exposed through either of the data selection apertures 172 and 173, everything within the photographic field of the recording instrument which might register as an image upon the sensitized base sheet 43 when the instrument is operated will be effectively concealed.

The outer surfaces of the shield plate 165 and the masking plate 171 are preferably finished in a non-reflecting, dead black or other non-recording color so that when the recording instrument 44 is operated, nothing will register upon the sensitized base sheet 43 except the particular portion of the record sheet 40 which has been selected for exposure. In this manner each data receiving section of the sensitized base sheet 43 may be exposed twice, once to receive the image of the primary data at one side thereof and then again to receive the image of the secondary data at the other side thereof. As an additional protection against accidental light reflection which might cause spoilage of the sensitized base sheet 43 when the recording instrument is operated, the sides of the masking plate 171 may be extended substantially beyond the side edges of the shield plate 165 and may be turned up as indicated at 175.

In order to adapt the mask plate 171 for shifting movement, it is mounted pivotally at its front edge upon a pair of rocker arms 176 one being located at each side (Figs. 11 and 13). These rocker arms are pivotally connected to the lower ends of wing extensions 177 which depend from the side edges of the shield plate 165, and the forward and rearward swinging movements of the arms are limited by front and rear stop pins 178 and 179, respectively. Through this arrangement, when the shield plate 165 is lifted the mask plate will simultaneously lift away from the table 128. At the rear, the mask plate 171 is pivotally supported by a rocker bail 180 which has arms 181 pivotally connected at their ends to appropriately located ears 182 on the rear end of the table 128. Thus, it will be observed that the mask plate 171 can be quickly swung into its front or rear positions by rocking of the supporting arms to bring the primary data selection apertures 172 or the secondary data selection aperture 173, respectively, into register with the exposure aperture 170.

Record sheet positioning means

As the trailing end of each of the record sheets 40 leaves the feed rollers 155, the advance end thereof reaches the position wherein the primary data is exposed through the shield plate aperture 170 and the registering primary data aperture 172 of the mask plate (Fig. 11). Thereupon the record sheet is engaged by the holding means 48 which will maintain the sheet in this position until the primary data has been photographed. Herein the holding means includes a pair of spaced stops 183 which are located in the path of and will be engaged by the advance edge of the record sheet. These stops 183 may be in the form of pins which are mounted to project from a carriage, indicated generally by the numeral 184. A head plate 185 on the carriage at the inner ends of the stops 183 serves as a base against which a pair of grippers 187 slidably associated with the stops will clamp the advance margin of the sheet. The sheet receiving surface of the head plate is adapted to be substantially flush with the upper surface of the table 128 when the record sheet is moved into position (Fig. 15).

As best shown in Figs. 25 and 26, the carriage 184 has a body block 188 and the grippers 187 have shanks 189 which extend slidably inwardly through the head plate 185 and through guide bosses 190 on the body block. The inner end portions of the shanks 189 project substantially beyond the bosses 190, and compression springs 191 surround each of the shanks between the inner faces of the respective bosses 190 and spaced abutment washers 192 on the inner ends of the shanks normally to urge the grippers into sheet-gripping relation. For releasing the grippers, a horizontal release bar 193 is located to be moved into engagement with the inner ends of the shanks 189 to urge the grippers outwardly in opposition to the compression springs 191. The release bar 193 is rockably supported by and projects beyond the opposite end walls 194 and 195 of a carriage-supporting drum 196. This drum (Fig. 15) is rotatably supported behind the table 128 by means of an axle shaft 197 extending fixedly through the end walls 194 and 195 and having its opposite ends supported by the main frame 55 in a manner to be hereinafter more fully described. Preferably the relationship of the table 128 and the drum is such that the main sheet-supporting surface of the table is on a tangent to the periphery of the drum (Figs. 12 and 28).

Means is provided for controlling the gripper release bar 193 so that it will hold the grippers released until the sheet is in position to be gripped and then permit the grippers to act. Accordingly, one end of the release bar 193, herein the end which projects beyond the end wall 194 of the drum, is provided with a crank 198 which is adapted to engage a bell crank pawl or holding member 199 which is normally so disposed that when the carriage 184 is in sheet-receiving position the crank 198 will be held to maintain the release bar 193 in gripper-releasing position (Figs. 16 and 23). In the rotation of the drum 196, the crank 198 is adapted to ride up a stationary cam 199ª onto the holding member 199.

When any one of the record sheets 40 is in position to be gripped, it will engage a suitably supported, swingable switch arm 200 to close a normally open switch 201. Thereupon, an electrical circuit (to be more fully described hereinafter) will be closed for energizing a solenoid 202 which will act to swing the holding pawl member 199 against the force of a compression spring 203 out of holding relation to the crank 198. This allows the crank 198 to fall so that the release bar 193 will be rocked out of gripper-releasing position (dot and dash position of Fig. 23).

Repositioning mechanism

After the primary data upon the record sheet 40, which is held by the grippers 187, has been photographed, the carriage 184 is adapted to be shifted by the mechanism 50 to a new position axially of the drum 196 to reposition the record sheet for exposure of the secondary data. To this end the carriage is constructed to slide longitudinally in an axially extending slot 204 in the peripheral wall of the drum, the opposite margins of the slot being defined by inwardly offset flanges 205 which are adapted to engage behind the margins of the head plate 185 and provide a slideway therefor (Figs. 11, 26 and 28). Secured to the opposite sides of the carriage body block 188 are a pair of similarly constructed, angularly shaped, twin-wing side plates 206. A wing 207 (Figs. 25 and 26) of each side plate is attached to the body block. Such wings extend coextensively in parallel relation substantially beyond the inner edge of the body block. A wing 207ª of each plate adjoins the adjacent inner face of the head plate 185. At their outer margins the wings 207ª are shaped to provide offset flanges 207ᵇ which are adapted to engage the inner sides of the offset slideway flanges 205 of the drum to serve as retainers for the carriage. Through this arrangement, when the carriage is moved along the slideway flanges 205 to traverse the length of the drum 196 while engaging one of the record sheets 40, the latter will be shifted laterally across the table 128 from one side of the photographic field of the recording instrument 44 to the other.

Preferably the permissible traverse motion of the carriage 184 is sufficient to carry the engaged record sheet 40 a full sheet width as, for example, from the full line position to the dot and dash line position shown in Fig. 11. Such motion of the carriage 184 is effected rapidly by the repositioning mechanism 50 which, in the present instance, is in the form of a suitable double stroke mechanism including a pinion 208 meshing with a rack 209 on the inner edge of the carriage body 188 and with a stationary rack bar 210 located in opposed spaced parallel relation to the rack 209 (Fig. 15). The rack bar 210 is fixedly secured at its opposite ends to the end walls 194 and 195 of the drum. The pinion is guided for movement by the parallel inward extensions of the side plate flanges 207 of the carriage which are provided with alined longitudinal slots 211 to provide slideways for the opposite ends of a pinion axle 212 (Fig. 26).

Since the secondary data items 41 and 42 are located substantially below the primary data portion A of the record sheet 40, it is necessary not only to shift the sheet laterally but also to advance it in order to bring the secondary data into alinement with the position originally occupied by the primary data at the median line of focus of the recording instrument 44. Therefore, in addition to the traverse movement of the carriage 184, a sheet-advancing movement is imparted thereto by rotation of the drum 196. Moreover, means is provided for so correlating the traverse and sheet-advancing movements of the carriage that the record sheet 40 will be fully shifted laterally by the time the drum has been rotated to carry the sheet to the necessary advanced position.

Suitable mechanism having this correlating function, as best seen in Figs. 15, 26 and 28, includes a pair of short links 213 connected at one of their respective ends to the respective opposite ends of the pinion axle 212. At their opposite ends the links 213 have a pivotal connection with the free ends of a pair of spaced parallel long arms 214 of a twin-arm bell crank actuator 215. The latter is pivotally connected by means of a pin 217 in a stationary clevis 218 and has a short angular arm 219 which is connected to one end of an actuating tension spring 220. At its opposite end the spring is connected to a suitable boss 221 on the associated rack bar 210. This arrangement is such that when the carriage 184 is in its initial position, that is, the extreme left hand position as seen in Fig. 15, the actuating spring 220 will be stretched and thereby placed under tension so as to tend to rock the actuator 215 toward the right to cause rotation of the pinion 208 along the rack bar 210 and thereby effect the traverse movement of the carriage 184.

Before the record sheet is to be repositioned, the before-mentioned initial position of the carriage is suitably maintained in opposition to the tension of the actuating spring 220 by means such as a reciprocable control rod 222 which coacts with the actuator arms 214. Herein the control rod extends between the actuator arms in parallel relation to the associated rack bar 210 on the diametrically opposite side of the drum shaft 197 and has its opposite ends slidably supported by the end walls 194 and 195 of the drum. That portion of the control rod 222 which extends between the associated actuator arms 214 carries a hub-shaped boss 223 which has oppositely extending means such as pins 224, the latter engaging within suitable alined, longitudinally elongated slots 225 in the actuating arms.

One end of the control rod, herein the right end as seen in Fig. 15, projects beyond the end wall 195 and carries a transverse follower 227 to ride upon a stationary barrel cam 228. This cam is so contoured that when the carriage 184 is to be located in its initial position, the follower 227 will be at the extreme high point of the cam and the control rod 222 will be held at its extreme inner position. As the drum 196 is rotated, the follower will ride off of the high point of the cam to permit the control rod 222 to move rapidly outwardly under the influence of the actuating spring 220 thus permitting the actuator to rock and operate the double stroke mechanism 50. The contour of the cam 228 is so related to the drum, moreover, that when the drum shall have been rotated to advance the record sheet 40 sufficiently, the carriage 184 will be in its extreme traverse position on the drum. Upon continued rotation of the drum 196, and preferably after the drum has traveled through more than a half revolution, the control rod 222 will be forced inwardly by the cam to cause the carriage 184 to be shifted back to its initial position. In the present instance the cam 228 is supported fixedly by a hub-shaped bearing member 229 which is integral with the main frame 55 of the machine and within which one end of the drum shaft 197 is journaled.

In order to double the capacity of the machine, the drum 196 preferably supports two of the carriages 184 at diametrically opposite sides, the arrangement of operating mechanisms within the drum lending itself favorably to such duplication. The two operating mechanisms are substantially identical and are so coordinated in operation through the medium of the cam 228 that the carriages 184 will, at any rotational position of the drum 196 be at opposite points in their traverse paths on the drum. That is, when one of the carriages is in the initial position, the other carriage will be in its extreme traverse position, (Fig. 15). Thus, one of the carriages will always be returning to its initial position while the other is advancing the record sheet engaged thereby.

It may be noted that as a matter of convenience the clevises 218 which support the actuators 215 may be carried as integral projections extending from suitable points on the backs of the respective rack bars 210 of the two carriage operating mechanisms.

When the carriages 184 are in their extreme traverse position and the respective record sheets 40 engaged thereby are in position to photograph the secondary data, a narrow strip entirely across the positioned record sheets will be exposed through the selection aperture 173 of the mask plate 171. However, a selected portion less than the entire strip may be exposed by suitably limiting the traverse movement of the carriage to carry the subject record sheet laterally only partially under the selection aperture 173. For this purpose, cam adjusting means such as a slip ring 230 is mounted concentrically about the cam 228. This slip ring is movable in an axial direction along the cam 228 until its inner edge extends a predetermined distance beyond the low point of the cam. There such edge will engage the control rod followers 227 as they travel off of the high point of the cam whereby to limit the outward movement of the control rods. As a result, the carriages 184 will not reach their extreme traverse position, but will be held at an intermediate position (Fig. 21).

Herein the means for shifting and holding the slip ring 230 in any selected operative position axially of the cam, is in the form of a shifter yoke 231 which is rockably supported between suitable journal arms 232 on the framework 55 at opposite sides of the bearing 229. Adjacent to the ends of the arms of the shifter yoke 231, slots 233 receive pins 234 which project diametrically from opposite sides of the ring 230 (Figs. 13, 14 and 21). Inward or outward rocking movement of the shifter yoke 231 will therefore cause the slip ring to move correspondingly. For thus rocking the shifter yoke 231 it has a rigid arm 235 of substantially bell-crank shape extending therefrom. Such rocking arm is adapted to be anchored at the adjusted positions thereof to hold the slip ring in corresponding adjustment. Relative rotary movement between the slip ring and the cam may be avoided by one or more spline keys 236.

At the same time that the shifter yoke 231 is rocked to vary the traverse limit of the carriages 184, it operates also in the present instance to effect closure of that portion of the secondary data exposure opening 173 of the masking plate 171 which remains between the outer edge of the repositioned data sheet and the outer end of the opening. Suitable means for this purpose includes a masking strip such as a metal tape 237 which extends longitudinally of the aperture 173 and is supported slidably upon the inner face of the masking plate 171 by means of angular guides 239 (Figs. 12, 15 and 21). The tape projects from and is curled about a drum 240 to which its outer end is fixedly secured. The drum 240 has a rigid axle 241 journaled in spaced parallel supporting bracket plates 242 which depend from the adjacent turned-up side 175 of the shield plate (Fig. 13). One end of the axle 241 has rigid therewith an elongated, coaxial pinion 243 which meshes with a suitable segment gear 244 that is carried rigidly by the shifter yoke 231. Through this arrangement, as the shifter yoke is rocked to vary the position of the slip ring 230, the segment gear 244 will cause the drum 240 to rotate and correspondingly move the masking tape 237 longitudinally of the secondary data aperture 173. If desired, of course, the tape drum 240 could be adapted for hand operation with only slight alteration to control the tape independently of the shifter yoke 231.

As the drum 196 is rotated to effect actuation of the carriages 184 in the manner hereinbefore described, it also coordinately rocks the mask plate 171 from the primary-data exposure position thereof to the secondary-data exposure position and return. For this purpose one of the supporting bail arms 181, herein the arm adjacent to the right hand end of the drum 196 (Figs. 13 and 15), is provided with a rigid crank extension 245 at its lower pivoted end. This crank extension includes a follower 247 adapted to ride in suitable cam tracks 248 formed in a pair of identical guide members 249 which are mounted rigidly on diametrically opposite sides of the drum end wall 195. Each of the cam tracks 248 is of such length, delineation and location relative to the circumference of the drum, that as the drum is rotated to shift one of the carriages 184 to the secondary-data exposure position, the supporting bail 180 will be rocked to shift the mask plate 171 forwardly, thus carrying the secondary-data aperture 173 into register with the exposure opening 170 of the shield plate 165. Further rotation of the drum causes the supporting bail to be rocked back again by the respective track 248 to return the masking plate to its original or primary-data exposure position.

Suitable means is provided for rotating the drum 196 step by step to effect the operations of the carriage actuating and mask shifting mechanisms as described. Such means may include a pulley wheel 250 driven continuously by a belt 251 which runs over the driving pulley 81 (Figs. 1 and 3). The hub of the pulley wheel 250 is secured fast upon the outer end of a sleeve shaft 252 mounted concentrically for relative rotation upon the left end of the drum shaft 197 as seen in Fig. 15. An elongated bearing 253 for the sleeve shaft 252 may be formed integral with the main frame 55 coaxially with the opposite drum shaft bearing 229.

Rigidly at its inner end the sleeve shaft 252 carries an inwardly facing, hollow-faced disk clutch member 254 which has an annular rim flange 255 including an internal series of generally radially projecting teeth 256 (Figs. 15, 16 and 17). Engageable with the clutch teeth 256 is a complementary tooth 257 formed upon a generally U-shaped, movable clutch element 258 which straddles the rim flange 255. The clutch element 258 is mounted to slide on a generally radial axis in a suitable outwardly and radially opening guide casing 259 formed integral with the drum end wall 194. Pressure is normally maintained on the inner end of the clutch element 258 by a compression spring 260 to force the tooth 257 into engagement with one of the teeth 255, thus to connect the drum and the continuously driven sleeve shaft 252 for joint rotation.

For the purpose of disconnecting the clutch, when the drum 196 is to be stopped for locating the carriages 184 in their respective initial or sheet-receiving positions, suitable means such as declutching arms 261 will force the movable clutch element 258 and the rim flange 255 apart. The arms 261 are mounted upon an axially movable collar 262 which is splined concentrically upon the bearing 253. Cammed declutching and locking fingers 263 on the arms 261 extend into the path of the clutch element 258 to engage and force the latter inwardly against the compression spring 260 to carry the clutch tooth 257 out of engagement with the teeth 255. This causes the drum to be stopped instantly upon release of the clutch element. Inwardly extending legs 263a on the movable clutch element 258 on either side of the spring 260 serve as guides and as centralizers for the spring.

A second similarly constructed diametrically oppositely extending pair of declutching arms 264 is carried by a sleeve 265 which concentrically surrounds the collar 262 slidably for relative rotary but not axial movement. The latter declutching arms are adapted to act similarly as the arms 261 to stop the drum when it reaches the respective secondary-data exposure positions of the carriages 184.

The declutching arms 261 and 264 are normally held in the path of the clutch element 258 by a clutch actuating yoke 266 which is supported rockably in a suitable manner below the bearing 253 and has clevis arms 267 which engage radial pins 268 projecting at diametrically opposite sides from the outer end portion of the collar 262 (Figs. 14 and 22). A compression spring 269 (Fig. 15) normally urges the actuating yoke 266 into the declutching position.

Operation of the clutch actuating yoke 266 to shift the declutching arms 261 and 264 to inactive position is effected automatically at timed intervals by suitable means such as a solenoid 270 which when energized bears against a rocker finger 271 rigid with the yoke to move the latter against the force of the compression spring 269. In the present instance the solenoid 270 is operated by an electrical circuit controlled by the sheet actuating switch 201 as well as by an electrical circuit controlled by a normally open switch 272 which is carried by one of the declutching arms 264. These electrical circuits will be further described hereafter.

The switch 272 includes a switch arm 273 having a contact finger 274 (Figs. 16 and 19) to engage periodically with diametrically opposite actuating pins 275 that project rigidly from the drum end wall 194. Thus, closure of the switch 201 will cause the solenoid 270 to be energized to rock the yoke 266 for releasing either of the declutching arms 261 from the clutch while closure of the switch 272 will cause the solenoid to be energized to effect release of either of the declutching arms 264 from the clutch (dot and dash position Fig. 22). However, instantly upon deenergization of the solenoid 270, the declutching mechanism will become operative under the influence of the spring 269 to throw the declutching arms back into the path of the clutch element 258.

In order to halt the drum 196 at selected variable positions to permit exposure of selected secondary-data portions of the record sheet from top to bottom thereof, means is provided for adjusting the declutching positions of the arms 264. For example, at one time it may be desired to have the record sheets positioned to expose the secondary data 41 thereon and at another time to have the sheets positioned to expose the data 42 lower down. For this purpose, the arm-carrying collar 265 carries a rigid pin 276 (Figs. 14, 15, 16, 19 and 22) projecting in an axial direction therefrom to be engaged by a clevised shifter link 277 which is pivotally supported by the main frame 55. An actuating arm 278 is pivotally connected at one end to an intermediate point of the link 277 and extends into a suitable stationary housing 279 which is mounted at a convenient place upon the framework 55 (Figs. 1, 3, 16 and 19). Rigidly upon an axial shaft 280 within the housing is located a crossed pair of spaced parallel twin lobe cam plates 281 and 282. The inner end of the actuating bar 278 has an elongated eye 283 to receive the shaft 280 and extends between the cam plates so that the latter may act upon cam follower pins 284 and 285 extending from respectively opposite sides of the actuating bar 278 at opposite ends of the eye 283. When the shaft 280 is rotated by means of a hand crank 287, the actuating bar 278 will be reciprocated by the cam plates 281 and 282 once for every half revolution of the shaft. Thus, each quarter turn of the crank 287 will, by swinging of the shifter link 277, shift the sleeve 265 rotatably and effect a change of position of the associated declutching arms 264 from the full line position shown in Fig. 19 to the dot and dash position, or back to the full line position, as the case may be. For guidance in effecting such adjustment, the outside face of the housing 279 may bear appropriate indicia to indicate the four positions of adjustment and the handle for the crank 287 may be provided with a spring detent device 288 to engage in suitably recessed bosses 289 provided for this purpose, (Figs. 18, 20).

*Restacking mechanism*

After the selected secondary data has been photographed, the drum 196 is rotated to advance the carriage toward the restacking mechanism 51. Thereupon the trailing end of the record sheet 40 which has just been photographed will pass beyond the rear end of the shield plate 165 and fall between a vertical pair of spaced parallel retaining walls 290 which form part of an inclined restacker chute 291. This chute may be supported partially below the drum 196 by means of brackets 292 which are secured to the rear wall of a restacker frame 293 defining a well into which the discharged sheet will pass from the chute (Figs. 1 and 28).

Substantially as the trailing end portion of the sheet passes into the chute the advancing end is released from the carriage 184 by opening of the grippers 187. As shown in Fig. 28, this is effected when the loaded carriage 184 reaches a substantially inverted position, whereupon the crank 198 of the associated gripper release bar 193 rides onto a stationary actuating cam member 294 and is operated to release the grippers 187 from the sheet.

As the record sheet is released from the grippers 187, the advance edge thereof may be engaged and positively forced from the carriage 184 by a substantially wedge-shaped stripper 295 the point of which is accommodated in a clearance aperture 297 provided for that purpose in the carriage head plate 185 (Figs. 25 and 28). Herein the stripper 295 is supported by a rock shaft 298 which is journaled at its opposite ends in the chute side walls 290 below the drum 196 (Figs. 14 and 28). A rigid actuating lever 299 near one end of the rock shaft 298 is connected to a tension spring 300 which serves to hold the stripper normally in its inactive position, the active position of the stripper being attained when the lever is acted upon by a fixedly mounted solenoid 301 to rock the shaft in opposition to the force of the spring.

The released record sheet will begin to slide down the chute 291, as indicated in dot and dash outline in Fig. 28, and at this time a roller 302 may be brought down upon the sheet to lend impetus to its sliding movement and to positively clear it from the chute. As best seen in Figs. 14 and 28, the impetus roller 302 is continuously driven through the medium of a flexible shaft 303 which is suitably connected with the main driving shaft 82. Support for the impetus roller is provided by an angular rocker bracket 304 (Fig. 14) which is suitably secured pivotally to the exterior face of the inner side wall of the well frame 293 and has a roller carrying arm extending inwardly through an elongated aperture 305 in the inner chute wall 290. Suitable means such as a tension spring 307 connected to the rocker bracket holds the latter normally in the position where the impetus roller remains inactive, and a solenoid 308 is adapted to swing the rocker bracket in opposition to the force of the spring to carry the impetus roller into sheet-engaging position.

Energization of the stripper solenoid 301 and the impetus roller solenoid 308 in timed sequence is controlled by normally open control switches 309 and 310, respectively. Herein these switches have rockable contact arms 311 and 312, respectively, which are normally maintained in open switch position by tension springs 313 and 314, respectively (Figs. 13 and 14). The switch 309 is adapted to be the first one closed by engagement of its contact arm 311 with one of a pair of switch closing pins 315. These pins are adapted for movement with the drum 196 and are therefore conveniently mounted at diametrically opposite sides of the drum to project from the outer faces of the advance end portions of the mask shifter guide members 249. Immediately after the contact arm 311 has been engaged by and passes beyond one of the pins 315, the contact arm 312 will be engaged by such pin to close the switch 310.

Upon leaving the chute 291, the successive discharged record sheets 40 pass into the well formed by the framework 293 and are stopped by the forward wall of the latter to be received upon a stack platform 317 (Figs. 1, 24 and 28). A support for the platform is provided by a table 318 from which the platform when loaded may be removed through the open outer side of the well framework 293 to deliver up the restacked record sheets.

Proper restacking of the sheets upon the platform is assured by keeping the top of the stack close to the plane of descent of the chute 291, the restacking platform being retracted step by step as the stack height increases. For this purpose suitable elevation controlling means, including a feed screw 319 is provided in association with the elevator table 318. This feed screw is connected rigidly to the lower face of the elevator table and is threaded through a rotatable nut 320. The latter is carried by a suitable bearing 321 which is appropriately mounted fixedly at the lower end of the well framework 293.

Rotation of the nut 320 in opposite directions will, of course, respectively advance or retract the feed screw 319. To effect such rotation a bevel gear 322, which meshes with a bevel pinion portion 323 integral with the nut, is mounted to rotate freely upon the inner end portion of a driving shaft 324. The inner tip of the shaft 324 is permanently journaled in a suitable bearing bracket member 325 below the nut. At its opposite or outer end portion the shaft is journaled in and extends outwardly beyond a bearing 327 which is formed integrally with the main frame 55 of the machine. A pulley 328 keyed to the outer end of the shaft 324 may be driven continuously through the medium of a driving belt 329 which passes around the main drive pulley 81.

A disconnectible power driving connection between the driving shaft 324 and the bevel gear 322 is effected by a toothed clutch member 330 which is freely coaxial about the shaft. This clutch member is adapted to be urged by a compression spring 331 simultaneously into engagement with a star clutch element 332 fast upon the shaft and also with a complementally toothed clutch portion 333 integral with the bevel gear. Herein the direction of power rotation of the driving shaft 324 is such that when the clutch is operative the nut 320 will be rotated to retract the feed screw 319.

Rotation of the shaft 324 in the opposite direction to cause elevation of the restacker platform may be effected manually as by means of the removable hand crank 78 applied to the squared off pulley end of the shaft when the machine is stopped. An automatically disconnectible driving connection for this purpose may be provided by means such as a ball clutch including balls 334 working between the pinion 322 and the shaft 324 (Fig. 27). When the shaft is power driven the balls 334 ride freely but when the shaft is driven manually in the opposite direction the balls act to connect the shaft and pinion solidly for joint rotation.

Clutch controlling means similar to that hereinbefore described in connection with the clutch of the delivery mechanism 45 may be utilized to hold the clutch member 330 disengaged except when the stack is to be raised or lowered (Fig. 24). Hence, a rockable declutching arm 335 is mounted adjacent to the clutch mechanism and has a cam finger 336 adapted to engage a declutching pin 337 rigid with the clutch element 330 to force the latter to inactive position against the force of the spring 331. A tension spring 338 holds the arm 335 normally in pin-engaging position and a solenoid 339 is adapted to be intermittently energized by the closing of a switch 340 (Fig. 1) to release the declutching arm. The switch 340 is mounted near the top of the restacker well frame 293 and has a pivoted contact arm 341 which is adapted to rest upon the uppermost of the restacked sheets. After a certain number of sheets have been discharged into the restacker, the switch arm 341 is moved up by the increase in stack height to close the switch 340. Thereupon a suitable electrical circuit (to be further described hereafter) is closed to energize the solenoid 339 for shifting the arm 335 to release the restacker clutch so that the stack will be lowered to receive additional discharged sheets. Dropping of the contact arm 341 with the lowering stack will then open the switch 340 to break the circuit. Thus, the stack will be lowered step by step as the switch 340 is successively closed and opened in direct response to loading of the restacker.

When the traverse position of the carriages 184 is varied as described hereinbefore, the discharge path of the record sheets will, of course, be correspondingly varied and it will therefore be necessary also to adjust the alinement of the restacker 51 with the discharge path to receive the sheets. Herein such adjustment is effected simultaneously with adjustment of the traverse controlling cam assembly by connecting the lower end of the adjusting handle 235 to the restacker and by mounting the restacker for transverse movement relative to the main frame 55. As shown in Figs. 13, 14 and 21, the handle 235 may be connected by means of a link 342 to a rigid connecting angle 342ᵃ on the outer supporting bracket 292 of the discharge chute of the stacker. This relationship is such that adjustment of the transverse controlling cam mechanism and the restacker will be exactly coordinated so that the restacker will always be perfectly alined with the carriages 184 in the sheet discharge positions of the latter.

To enable ready adjustment of the restacker it may be movably mounted upon a pair of horizontally spaced parallel front and rear suspension bars or rods 343 and 344, respectively, (Figs. 1, 24 and 28) which are supported at their opposite ends by the lower part of the main frame 55. The front supporting rod 343 may be constructed as a rotatable shaft from which the restacker is suspended by a sliding bearing 345, integral with the top of one side of the framework 293, and a coaxial nut 347 fixedly carried by the opposite side of the framework. A threaded section 348 of the front supporting rod coacts with the nut 347 upon rotation of the shaft in either direction to move the restacker in respectively opposite axial directions therealong. Such rotation of the supporting shaft may be effected by means of the hand crank 78 which can be applied to a squared off crank receiving section 349 on one end of the shaft. It will thus be seen that adjustment of both the restacker and the traverse-controlling cam mechanism can be effected simply by rotating the front stacker supporting rod 343. Particular positions of adjustment of the restacker may be indicated by means of a suitable guide such, for example, as shown in Fig. 3 where an arrow 350 on the upper face of the chute 291 is adapted to register with suitably located guide marks 351 at the back of the main frame 55.

An anti-friction engagement between the restacker and the rear suspension rod 344 may be provided by a roller 352 which is rotatable upon a stud shaft 353 projecting rearwardly from a base plate 354. The latter may be fixed upon the vertical center line of the rear wall of the restacker frame 293.

In the adjustment movements of the restacker, the driving shaft 324 will slide freely axially through the bearing 327 and the pulley 328, with the latter of which it has a spline key connection. A clip 355 on the bearing 327 holds the pulley against axial movement.

Electrical control circuits

Figure 29:
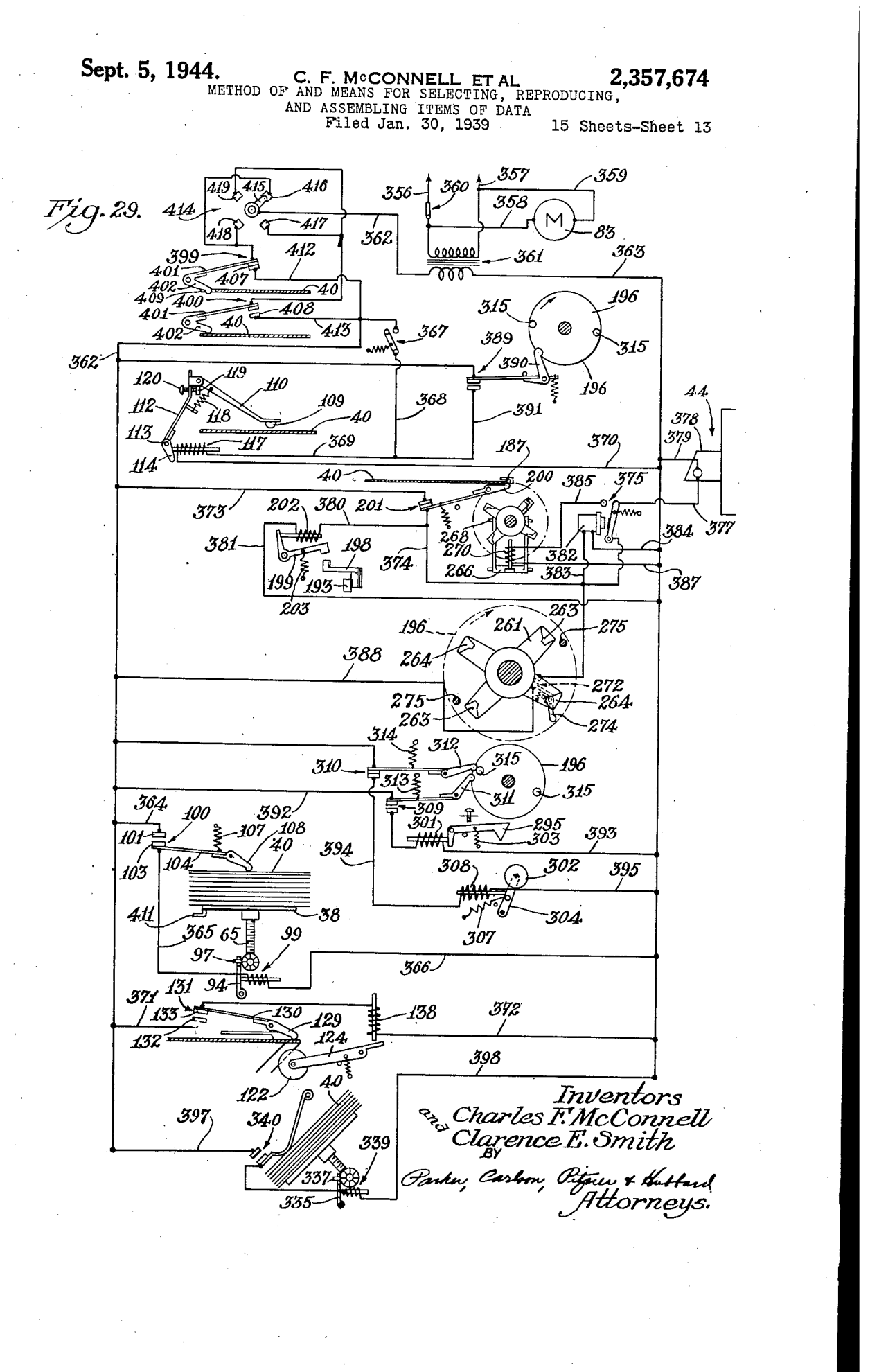

The machine may be controlled for automatic, cyclical operation by a system of electrical circuits such as suggested in Fig. 29. Electricity for the circuits is supplied by power lines 356 and 357 from which leads 358 and 359, respectively, will complete a circuit for the driving motor 83. A master control switch 360 may be interposed in the power line 356 ahead of the lead 358. Upon closing of the master switch 360, the motor will be set into continuous operation and electrical current will be supplied through a transformer 361 to a master circuit including principal leads 362 and 363. Through these master circuit leads electricity is transmitted to several more or less related circuits connected in parallel thereacross and which respectively contain the several switches by which the operations of the apparatus are controlled.

If, when the master switch 360 is closed, the stack of record sheets 40 in the delivery means 45 is below the level where delivery may take place, so that the switch 100 is closed, a circuit will be closed between the principal leads 362 and 363 through a lead 364, the switch 100, a lead 365, the elevator clutch solenoid 99, and a lead 366. This will effect energization of the solenoid 99 and thus cause elevation of the stack of leaves to delivery height to open the switch 100.

Thereupon, if a normally open switch 367 is closed manually to complete a circuit between the master leads 362 and 363 through a lead 368, a lead 369, the pusher solenoid 117 and a lead 370, the solenoid 117 will be energized to drive the delivery pusher 109 to move a sheet from the stack. The switch 367 may then be released and all of the subsequent operations of the apparatus will take place in continuous repeated cycles automatically as long as properly placed record sheets remain to be photographed.

Should more than one sheet be delivered by the pusher 109 so that the kick-back switch 131 is closed, then a circuit will be closed through leads 371 and 372 to energize the solenoid 138 and thus cause the kick-back roller 122 to operate for returning the extra sheet to the stack.

Each of the delivered record sheets 40 will be fed onward until it engages the switch arm 200 to close the switch 201. This will complete a circuit by way of a lead 373, lead 374, a biased double-throw switch 375, a lead 377, suitable means 378 for operating the recording instrument 44, and a lead 379, whereby to actuate the operating means 378 and cause the recording instrument 44 to photograph the primary data D of the record sheet. Closure of the circuit through the switch 201 is also effective to close a circuit through the lead 374, and solenoid leads 380 and 381 to energize the solenoid 202 and shift the gripper release bar holder 199 to its inactive position so that the grippers 187 will be released to become operative for engaging the advance margin of the record sheet. Simultaneously a delayed action relay 382 will be energized by the closing of a circuit through the lead 374, a lead 383 and a lead 384.

After the recording instrument has been operated, the relay 382 will become active to throw the switch 375 in opposition to its normal bias whereby to break the instrument-actuating circuit and to close a circuit through the switch from the lead 374 through leads 385 and 387 to energize the drum clutch solenoid 270 and thus cause the drum clutch to operate for advancing the drum 196. As the record sheet 40 is advanced, it will, of course, move away from the switch arm 200 whereupon the switch 201 will be opened to break the circuits controlled thereby and deenergize the gripper release solenoid 202, the relay 382 and the drum clutch solenoid 270.

The drum 196 will then be halted when it reaches the selected advanced position wherein the secondary data is to be photographed.

Substantially coincident with such halting of the drum 196, closure of the switch 272 is effected by interengagement of the switch finger 274 and one of the actuating pins 275. This closes a circuit through a lead 388, which is connected with the leads 374 and 383, thus effecting a repetition in the timed operation of the energizing circuits for the instrument-operating means 378 and the drum-clutch solenoid 270.

Upon reenergization of the drum-clutch solenoid 270 and further advance movement of the drum 196, a normally open pusher control switch 389 will be closed by the interaction of one of the actuating pins 315 on the drum with a rockably mounted switch-actuating bell crank lever 390 (Figs. 13 and 29). This momentarily recloses the pusher-solenoid energizing circuit through the medium of a lead 391 which is connected to the pusher solenoid lead 369. Another of the record sheets 40 will thus be started on its way to be photographed.

As rotation of the drum continues, the actuating pin 315 leaves the switch lever 390 and successively engages the switch levers 311 and 312 to close the switches 309 and 310, respectively. Thereby a stripper solenoid circuit through leads 392 and 393, and a circuit for the impetus roller solenoid 308, including leads 394 and 395, will be closed in succession. Substantially as the impetus roller is brought into play, the drum 196 will be halted at the sheet-discharging position of one of the sheet carriages 184. This also places the other sheet carriages 184 in position to receive the record sheet 40 which was placed in motion by the pusher 109 when the switch 389 was closed, thus initiating another cycle of operation.

From time to time as the stack of discharged sheets in the restacker increases, the restacker switch 340 will be closed to complete a circuit through leads 397 and 398 to energize the restacker clutch solenoid 339 and cause the stack to be lowered.

Suitable control means may be provided for detecting the improper placement of any of the sheets 40 in the delivery stack and for halting the apparatus before such sheets can be delivered. For example, where the data which is to be reproduced appears on one side of the record sheets, and any sheet in the stack has been inadvertently placed obversely or end for end, then it is desirable that such error be called to the attention of the operator as by stoppage of the machine before the improperly placed sheet can be delivered to the feeding mechanism.

As shown, a pair of normally closed detector switches 399 and 400 is mounted upon the delivery mechanism 45 (Figs. 3 and 7). Each switch includes a contact lever 401 having an angular engagement finger 402. The contact levers are pivotally supported adjacent to the respective opposite ends of a stationary rod 403 which may be carried by the front end of the delivery framework 63 in spaced parallel relationship above the pusher shaft 113. Brackets 404 and 405 on the opposite sides of the delivery framework are adapted to support stationary contacts 407 and 408 forming parts of the switches 399 and 400, respectively.

Each of the record sheets 40 is provided at its opposite ends with notches 409 and 410, respectively, which are relatively offset transversely of the sheet. These notches may be differently dimensioned and are so respectively located that they will receive the contact finger 402 of only one of the switches 399 or 400. Thus, the notch 409 may be shaped complementary to the engagement finger 402 of the switch 399 while the notch 410 may be shaped complementary to the engagement finger of the switch 400. Then, when a stack of the record sheets 40 is elevated to delivery position, one of the detector switches will remain closed or active because its engagement finger 402 will be received in the alined respective notches provided therefor, while the other switch will be opened by engagement of its finger 402 with the top of the stack. If any sheet has been improperly placed in the stack it will eventually be elevated to reach the engagement finger of the closed switch and due either to the improper notch thus presented to this engagement finger or the lack of a notch will cause the finger to move up and open the switch. Moreover, if after all of the sheets 40 have been delivered from the stack and photographed, the machine does not come to a halt, means such as a stop 411 on the elevator 64 will come into play to open the active detector switch.

Such opening of the active detector switch 399 or 400, as the case may be, will open the associated one of a pair of auxiliary control circuits governed by the switches. As shown in Fig. 29, these auxiliary circuits are connected in the master circuit lead 362 and one or the other of the auxiliary circuits must be closed before the master circuit can become active. The switch 399 may govern an auxiliary circuit through a lead 412, and the switch 400 may similarly govern an auxiliary circuit through a lead 413.

Another desirable control feature may reside in the provision of a selector switch 414 for determining which of the auxiliary circuit leads 412 or 413 shall become active according to which side of the record sheets is to be photographed. In the present instance the selector switch may be associated with the clutch control mechanism as shown in Figs. 19 and 20 for conjoint operation. To this end the selector switch is adapted to connect the auxiliary lead 412 into the master circuit when the clutch control is in either of its first two positions, while the lead 413 will be connected into the main circuit when the clutch control is in either of its third and fourth positions. For this purpose the crank 287 may be provided with a contact arm 415 which will successively engage with electrical contacts 416, 417, 418 and 419 which correspond to the four positions at which the adjustment crank may be set.

Modified forms of the invention

In some instances it may not be necessary to reposition the record sheet by transverse movement of the sheet carriage between exposures of the primary and secondary data because the data may be so located on the sheets that alined groups of data facsimiles can be made merely by exposing the necessary data portions at different points in an undeviating or straight line path of advance movement. An exemplary form of record sheet 420 adapted for this purpose is shown in Fig. 30 as including a primary data portion E at the left side of the head thereof. The secondary data portion may be located on the right side of the body of the sheet below the primary data portion E, substantially as indicated at F.

Thus, it will be possible to produce alined groups of facsimiles upon the base sheet 43 by the straight-line advancement of the record sheets, substantially as shown diagrammatically in Fig. 35.

Only relatively simple modification of the sheet handling machine hereinbefore described is necessary to adapt it for the straight-line sheet advance, while yet permitting it to be readapted for transverse shifting of the record sheets when necessary. As shown in Figs. 31 and 32, this may be accomplished by so constructing the main frame 55 and the adjustment handle 235 that the restacker 51 may be shifted to the extreme left side of the machine wherein it will be alined with the carriages 184 in the initial or sheet-receiving position of the latter. When in this position, the cam-adjusting slip ring 230 will have its inner edge coincident with the highest point of the cam 228 so that the position-controlling rods 222 of the carriages will be held against reciprocation and will thus maintain the carriages against transverse movement when the drum 196 is rotated. Operation of the machine will then proceed just as has already been described, with the possible exception that the switch 201 and its operating mechanism may be relocated or modified in obvious respects as may be necessary due to the non-deviating path of advance of the record sheets.

A slightly modified form of rocking mask plate 421 as shown in Fig. 31 may be used. In general this mask plate may be substantially the same as the mask plate 171 previously described, except that the body thereof will have a single large aperture 422 therein which will be covered by a removable adapter plate 423 (Fig. 33). To hold the adapter plate in place, the mask plate may be provided with corner clips or sockets 424. Appropriately located in the adapter plate is a suitably dimensioned primary data exposure aperture 425 and also a secondary data exposure aperture 426. As will be apparent, both of these apertures may be proportioned and located so as to select a desired portion of the primary and secondary data, respectively, as the mask plate 421 is successively rocked to and fro in the operation of the machine. For example, where the secondary data to be photographed may be selected from any one of four columns across the record sheet, as shown on the record sheet 420, then the secondary exposure aperture 426 may be located either at the full outline position shown in Fig. 33 or in any one of the three broken line positions indicated. Thus, the particular combinations of data to be selected may be readily varied by substituting adapter plates having the exposure apertures appropriately disposed.

If, as shown, the secondary data portion F of the record sheet 420 is provided with a plurality of data sections from top to bottom of the sheet in excess of two, then a slight modification of the drum-clutch adjusting mechanism may be desirable in order to permit halting of the drum selectively at any one of such secondary positions. For example, four data sections may be provided. As shown in Fig. 34, such modification may consist in providing a tensioning device such as a spring 427 for normally drawing the actuating arm 278 in one direction so that a follower pin 428 at the cam end of the arm will ride a four-position cam 429. Through this arrangement, the drum will be halted in a secondary-data exposure position determined by any one of the four positions to which the declutching arms 264 may be swung as indicated in full and broken outlines in Fig. 34.

In the modified form of the invention shown in Fig. 36, the record sheets are adapted to be fed in a vertical direction to be moved through the photographic range of a horizontally directed recording instrument 430. In this modified form the operating mechanism may, except for a few alterations, be essentially the same as that which has already been described. For example, a suitably modified main frame 431 may be provided wherein the driving motor 83 is mounted above the drum 196 and the restacker 51 is located below the drum in such a manner that the record sheets upon being discharged will slide down the chute 291 in reverse.

A different form of delivery mechanism may be adopted for the vertical feed machine. Such a delivery mechanism may include a hopper arrangement including one or more base bars 432 inclined downwardly toward a vertical abutment frame 433. A stack of record sheets 434 may be placed edgewise upon the base bars 432 and will be urged against the abutment frame 433 by a yieldable presser bar 435. As demand is made for delivery of the record sheets one by one to the feeding mechanism 47, a solenoid 437 will be energized to rock a delivery roller device 438 into coaction with a delivery shoulder 439 at the lower ends of the base bars 432, thus moving the foremost sheet of the stack onward to the feeding mechanism. One or more agitator rolls 440 may be provided to vibrate the stack of sheets and assist in loosening the sheets for delivery.

We claim as our invention:

1. Apparatus adapted for making a list of selected data in facsimile form from a mass of data contained on a plurality of record cards each of which contains a plurality of items to be listed comprising, in combination, means for masking each successive card to conceal all but certain data thereon, and means for making a photographic facsimile of said certain data, said concealing means being adapted after said certain data has been reproduced in facsimile to conceal all of the subject record card except certain other data so that said facsimile-making means can be operated to produce a photographic facsimile of such other data adjacent to the first facsimile, said masking means and said facsimile-making means being cooperative for repeating the beforementioned operations with each of the record cards in succession to make photographic facsimiles of the data therefrom in a particular order relative to the prior-made facsimiles until the list is completed.

2. Apparatus for practicing the method of making a data list by reproducing separate data items in fascsimile in predetermined order upon a common record sheet, comprising, in combination, photographic facsimile-making means located in a fixed position, means for transporting a succession of individual record cards into the field of activity of said facsimile-making means, and means for selecting a plurality of predetermined data items from remote points on each of the cards for photographic reproduction in facsimile while the cards are respectively in said field of activity.

3. Apparatus for practicing the method of making a data list by reproducing separate data items in facsimile in predetermined order upon a common record sheet, comprising, in combination, photographic facsimile-making means located in a fixed position, means for transporting a succession of individual record sheets into the field of activity of said facsimile-making means, and means for selecting certain predetermined data items on the individual sheets for photographic reproduction in facsimile while the individual sheets are respectively in said field of activity, said transporting means being adapted for moving the individual sheets in a transverse as well as a forwardly advancing direction through said field of activity.

4. Apparatus for use with photographic facsimile producing means adapted to form an assemblage of data contained as remotely separated items upon individual record sheets comprising, in combination, means for positioning each of the sheets fed thereto within the field of activity of the facsimile-producing means, means for selecting certain data to be reproduced in photographic facsimile while the sheet is thus positioned, means for operating the facsimile-producing means, and means for repositioning the sheet to bring another portion thereof containing other data into the field of activity of the facsimile-producing means.

5. Apparatus for producing an assemblage record from data contained as remotely located items upon individual record sheets comprising, in combination, photographic facsimile-producing means, means for moving a succession of data sheets to position different predetermined portions of each sheet in the field of activity of said facsimile-producing means, means for masking around such predetermined portions when the latter are in said field of activity to exclude the remainder of the sheet from the photographic facsimile, and means for correlating the operation of said facsimile-producing means with said movement effecting means.

6. Apparatus adapted for the photographic assemblage of selective data located at different places upon a record sheet comprising, in combination, means for positioning a record sheet with certain primary data at the median line of focus of a photographic recording instrument, means for concealing all but said primary data from the effective range of the instrument, means for operating said instrument to make a photographic reproduction of said primary data, means for shifting the record sheet to bring other data thereon into position at the median line of focus and adjacent to the place which had been occupied by said primary data, said concealing means being effective when the sheet has been repositioned to expose only said other data to said instrument, said operating means being again effective when the sheet has been repositioned to operate said instrument to make a photographic reproduction of said other data adjacent to the first reproduction, and means for receiving the sheet after said other data has been photographed.

7. Apparatus for use with a photographic recording instrument to produce an assembled record from data contained as remotely separated items upon individual record sheets comprising, in combination, sheet delivery means, means for feeding the sheets from said delivery means, means for engaging and positioning each fed sheet with a portion thereof in the focal range of the recording instrument, means for selecting certain data on said portion to be reproduced by the recording instrument when the sheet is thus positioned, means for operating the recording instrument coordinately with such positioning of the sheet to make a photographic reproduction of said certain data, means for repositioning the sheet relative to said selecting means to bring another portion thereof containing other data into the focal range of the recording instrument, means for operating said instrument again after repositioning of the sheet to make a photographic reproduction of said other data, and means for receiving the sheet from said repositioning means following the second operation of the recording instrument.

8. Apparatus adapted for the production of a photographic assemblage of selective data located at different places upon a record sheet comprising, in combination, means for positioning the record sheet with certain primary data at the median line of focus of a photographic recording instrument, means for concealing the remainder of the record sheet from the effective range of the instrument, means for actuating the instrument to make a photographic reproduction of said primary data, and means for shifting the record sheet to bring other data into position at the median line of focus in juxtaposition to the place which was occupied by said primary data and with all of the record sheet except said other data concealed from the effective range of the instrument by said concealing means, said actuating means also being operative in the latter position of the record sheet to actuate the instrument to make a photographic reproduction of said other data in juxtaposition to the reproduction of said primary data.

9. Apparatus for use with a photographic recording instrument to produce an assemblage of data contained as remotely separated items upon individual record sheets comprising, in combination, sheet delivery means, means for feeding the sheets delivered thereto from said delivery means, means operative to permit only one sheet to be fed at a time, means for engaging each fed sheet to position the sheet within the photographic field of the recording instrument, means for concealing all but certain data from the recording instrument when the sheet is thus positioned, means for operating the recording instrument coordinately with such positioning of the sheet to make a photographic reproduction of said certain data, means for repositioning the sheet relative to said concealing means to expose another portion thereof containing other data within the photographic field of the instrument, means for adjusting said repositioning means to vary the portion of the sheet to be exposed, means for operating said instrument again after repositioning of the sheet to make a photographic reproduction of said other data, said repositioning means being operable after said other data has been photographed to discharge the sheet, means for assuring discharge disengagement of the sheet from said repositioning means, means for receiving the discharged sheet, means for positively urging the discharged sheet away from said receiving means, and stacking means for collecting successive sheets passing from said receiving means.

10. Apparatus of the character described comprising, in combination, an enclosure having a substantial opening therein, means for moving a record sheet through said enclosure to cause selected portions of the sheet to be exposed through said opening and including a rotatable drum, means for rotating said drum to effect such movement of the sheet, a mask plate movably mounted in position to close said opening and having a plurality of apertures therein arranged in relatively offset relationship so as to register with said opening successively as said mask plate is moved, and means operative in the rotation of said drum to move said mask plate.

11. Apparatus of the character described comprising, in combination, means for supporting a data sheet, a shield in spaced relation to said means for concealing the sheet and having an opening for exposing a limited portion of the sheet, a member movably mounted relative to said shield and having an aperture larger than said opening, and an adapter plate removably carried by said member for closing said aperture, said plate having a plurality of relatively small spaced data selecting apertures adapted for successive registration with said opening.

12. Apparatus of the character described comprising, in combination, means for feeding a record sheet from a stack, means adapted for concealing all but a relatively small portion of the sheet, means for receiving and positioning the sheet relative to said concealing means to expose a selected portion of the sheet and including a rotatable drum and a sheet-engaging carriage supported for traverse movement axially of the drum as well as movement with said drum in the direction of its rotation, means for rotating said drum for a given distance to advance said carriage and the sheet engaged thereby to expose another selected portion of the sheet, and means operable as an incident to such advancing movement for actuating the carriage to traverse the drum.

13. Apparatus of the character described comprising, in combination, a photographic recording instrument, means for positioning a record sheet in one position within the photographic field of said instrument, an electrical circuit for controlling the operation of said recording instrument including a switch adapted to be closed by the sheet when the latter is initially positioned, a magnetic relay energized by closing of said switch and adapted after said instrument has been operated to close a second switch, means actuated as an incident to closing of said second switch for advancing said sheet-positioning means to reposition the sheet and to move the sheet away from said first switch, and a third switch adapted to be closed when the positioning means has reached an advanced position for closing the electrical circuit to again operate said recording device.

14. Cyclically operable apparatus for reproducing in photographic facsimile in juxtaposed arrangement upon a common sensitized base separate relatively widely separated items selected from a mass of data upon a single record card comprising, in combination, photographic facsimile-making means having a predetermined limited operating field, means for selecting a record card from a stack and delivering the same into said operating field in such a position that a photographic facsimile can be made of one selected data item, means for actuating said facsimile-making means upon the entrance of the card into said operating field, means for shifting the card to present a second selected data item thereon into said operating field, means for again effecting actuation of said facsimile-making means so as to reproduce said second data item closely adjacent to the first facsimile, and operation controlling means for assuring operation of all of the beforementioned means in timed orderly sequence.

15. Apparatus for practicing the method of incorporating in a condensed list a selected primary data item and a selected secondary data item inscribed in writing at relatively remote points among other related data on a record card, said apparatus comprising, in combination, a photographic instrument, means for supporting a stack of the record cards outside of the photographic field of the instrument, means for feeding the cards successively from the stack into said photographic field, means located to grip the leading edge of each of the record cards upon its entrance into said field and to position the card stationarily with the primary data within and at one side of the line of focus of the instrument, shiftable means for concealing all but such primary data item while the card is thus located, means operative upon engagement of the card by said gripping means for operating said instrument to produce a photographic image of said primary data at one side of a base sheet, means coordinated in operation with said instrument-operating means to become active after the photographing of the primary data to shift said gripping means a limited distance predetermined to move the card to a position where the secondary data item is within and at the opposite side of said line of focus adjacent to and substantially in alinement with the position which had been occupied by the primary data, means cooperative with said instrument-operating means and said coordinated means for shifting said concealing means when the card is thus moved to expose the secondary data and to conceal the remainder of the card, said instrument-operating means being arranged to operate again after shifting of the concealing means to produce a photographic image of said secondary data item upon said base sheet next to the image of the primary data, and means for receiving the record card after the secondary data item has been photographed.

16. Apparatus of the character described for selecting and reproducing in photographic facsimile selected primary and secondary data items contained at relatively remote points among other data upon record cards, said apparatus comprising, in combination, means for supporting a stack of the record cards and for successively feeding said cards into the operative field of a photographic instrument, a pair of successively operative devices for engaging and carrying said cards successively through said field, means for driving said devices by increments predetermined to locate the respectively engaged record cards stationarily first with the selected primary data and after an interval with the secondary data within the line of focus of said instrument, means for masking all but the selected primary or secondary data of the card as such data comes successively into the line of focus, means for operating said photographic instrument automatically in coordination with said operating means, and means for receiving the record cards after they have been photographed, said engaging devices being so arranged that the succeeding device becomes operative to engage a succeeding record card at substantially the time said card-receiving means receives the preceding card from its engaging device so as to maintain a continuous cycle of operations.

17. Apparatus of the character described comprising, in combination, a photographic instrument, means for engaging and locating a record card in successive positions wherein certain primary data and thereafter certain secondary data contained at remote points in a mass of related data are successively located within the line of focus of said instrument, means for operating said instrument in accordance with the operations of the engaging and locating means to produce photographic images of said primary and secondary data items upon a common sensitized base sheet, means for concealing all of the record card except the small area containing the respective selected data item during any given photographing operation of said instrument including a stationary shield plate and a movable mask plate, said shield plate having an opening large enough to expose an area across the entire data containing portion of the card, said masking plate substantially closing said opening and having an aperture registering with said opening in one position of the masking plate for exposing the primary data and another aperture registering with said opening in another position of said masking plate for exposing the secondary data, said apertures being so relatively located that only one at a time can be in registration with said opening while the remaining aperture is at the same time closed by an imperforate part of said shield plate, and means for operating said masking plate in coordination with said engaging and locating means and said photographing instrument.

18. The method of making a condensed reference page containing an assemblage of selected primary and secondary reference items taken from longitudinally spaced predetermined points on a plurality of record cards having, in addition to longitudinally spaced primary and secondary reference items, a mass of subordinate data, said method including the steps of photographically exposing on a sensitized reference page and at one side thereof a selected primary reference item of one of the record cards, photographically exposing on said sensitized reference page and in transverse alinement with the primary item exposure a selected secondary item from said one of said cards, and successively repeating these steps with each of said plurality of record cards to locate the successive exposures of said primary and secondary items of the respective cards in a predetermined columnar relation longitudinally of said sensitized reference page.

19. The method of making a reference page containing an assemblage of primary and secondary reference material taken from spaced predetermined points on a plurality of record cards, said method including the steps of masking a card to conceal all but said primary reference material, photographically exposing on a sensitized reference page said primary reference material, then masking said card to conceal all but said secondary reference material, photographically exposing on said sensitized reference page said secondary reference material adjacent to the primary reference material exposure, and repeating these steps with each of the record cards in succession to expose the primary and secondary reference material in a predetermined order on said sensitized reference page until the page is completed.

20. The method of making a reference page containing an assemblage of particular reference material taken from spaced predetermined points on a record sheet, said sheet containing in addition other reference material, said method including the steps of concealing all but predetermined reference material on said sheet, photographically exposing on a sensitized reference page said predetermined reference material, then concealing all of said record sheet except certain other reference material, and photographically exposing said other material to said sensitized reference page in a predetermined altered position relative to the first exposure.

CHARLES F. McCONNELL.
CLARENCE E. SMITH.